United States Patent
Wu et al.

(10) Patent No.: US 12,199,920 B2
(45) Date of Patent: Jan. 14, 2025

(54) COMMUNICATION METHOD, TERMINAL DEVICE, AND NETWORK DEVICE

(71) Applicant: Huawei Technologies Co., Ltd., Shenzhen (CN)

(72) Inventors: Ye Wu, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 17/099,219

(22) Filed: Nov. 16, 2020

(65) Prior Publication Data
US 2021/0075578 A1   Mar. 11, 2021

Related U.S. Application Data

(63) Continuation of application No. PCT/CN2019/087004, filed on May 15, 2019.

(30) Foreign Application Priority Data

May 17, 2018 (CN) .......................... 201810476001.1

(51) Int. Cl.
H04L 5/00 (2006.01)
H04W 24/08 (2009.01)

(52) U.S. Cl.
CPC .......... *H04L 5/0057* (2013.01); *H04W 24/08* (2013.01)

(58) Field of Classification Search
CPC ... H04L 5/0057; H04L 1/0026; H04L 1/0675; H04W 24/08; H04B 7/0456; H04B 7/0689; H04B 7/0669; H04B 7/068; H04B 7/0626
See application file for complete search history.

(56) References Cited

U.S. PATENT DOCUMENTS

| 2013/0343300 A1 | 12/2013 | Kim et al. |
| 2014/0036796 A1* | 2/2014 | Etemad .................. H04W 4/70 370/329 |

(Continued)

FOREIGN PATENT DOCUMENTS

| CN | 102448105 A | 5/2012 |
| CN | 102594526 A | 7/2012 |

(Continued)

OTHER PUBLICATIONS

Huawei, HiSilicon, "CSI measurement and reporting for coordinated transmission scheme", 3GPP TSG RAN WG1 Meeting #88, R1-1701679, Feb. 13-17, 2017, 7 pages, Athens, Greece.

(Continued)

*Primary Examiner* — Kibrom T Hailu
*Assistant Examiner* — Najeeb Ansari
(74) *Attorney, Agent, or Firm* — Slater Matsil, LLP

(57) ABSTRACT

This application provides a communication method, a terminal device, and a network device, to improve accuracy of CSI measurement. The method includes: receiving, by a terminal device, first indication information from a network device, where the first indication information is used to determine a first transmission scheme assumed for the terminal device to perform interference measurement; and sending, by the terminal device, channel state information (CSI), where the CSI is obtained by performing CSI measurement based on at least the first transmission scheme and a second transmission scheme, and the second transmission scheme is a transmission scheme assumed for the terminal device to perform channel measurement.

18 Claims, 5 Drawing Sheets

(56) References Cited

U.S. PATENT DOCUMENTS

| | | | |
|---|---|---|---|
| 2014/0185480 A1* | 7/2014 | Lee | H04W 36/302 |
| | | | 370/332 |
| 2015/0003368 A1* | 1/2015 | Park | H04L 5/0048 |
| | | | 370/329 |
| 2015/0098411 A1* | 4/2015 | Jongren | H04L 5/0073 |
| | | | 370/329 |
| 2015/0288505 A1 | 10/2015 | Park et al. | |
| 2015/0341942 A1 | 11/2015 | Lee et al. | |
| 2017/0117997 A1* | 4/2017 | Park | H04L 5/0057 |
| 2018/0007668 A1 | 1/2018 | Yum et al. | |
| 2018/0145735 A1* | 5/2018 | Chen | H04B 7/0486 |
| 2018/0262246 A1* | 9/2018 | Faxér | H04B 7/0452 |
| 2019/0123869 A1* | 4/2019 | Kakishima | H04L 5/0048 |
| 2020/0177353 A1 | 6/2020 | Ding et al. | |
| 2020/0236729 A1* | 7/2020 | Ahn | H04W 56/00 |
| 2021/0243634 A1* | 8/2021 | Li | H04L 5/0057 |
| 2021/0250141 A1* | 8/2021 | Shimezawa | H04L 5/0064 |

FOREIGN PATENT DOCUMENTS

| | | |
|---|---|---|
| CN | 104935389 A | 9/2015 |
| CN | 105099967 A | 11/2015 |
| CN | 106411374 A | 2/2017 |
| CN | 107431522 A | 12/2017 |
| CN | 107889222 A | 4/2018 |
| CN | 107911203 A | 4/2018 |
| CN | 108023666 A | 5/2018 |
| EP | 2637435 A1 | 9/2013 |
| WO | 2016072784 A1 | 5/2016 |

OTHER PUBLICATIONS

Huawei, HiSilicon, "Channel and interference measurement for CSI acquisition", R1-1711632, 3GPP TSG RAN WGI NR Ad Hoc Meeting, Jun. 27-30, 2017, 12 pages, Qingdao, China.

Huawei et al., "CSI measurement and reporting for coordinated transmission scheme", 3GPP TSG RAN WG1 Meeting #87, R1-1611674, Nov. 14-18, 2016, 5 pages, Reno, USA.

Huawei et al., "Channel and interference measurement for CSI acquisition", 3GPP TSG RAN WG1 Meeting #89, R1-1706927, May 15-19, 2017, 12 pages, Hangzhou, China.

* cited by examiner

COMMUNICATION METHOD, TERMINAL DEVICE, AND NETWORK DEVICE

CROSS-REFERENCE TO RELATED APPLICATIONS

This application is a continuation of International Application No. PCT/CN2019/087004, filed on May 15, 2019, which claims priority to Chinese Patent Application No. 201810476001.1, filed on May 17, 2018. The disclosures of the aforementioned applications are hereby incorporated by reference in their entireties.

TECHNICAL FIELD

This application relates to the communications field, and more specifically, to a communication method, a terminal device, and a network device.

BACKGROUND

Channel state information (CSI) may be used to describe a channel environment. In a multi-antenna system, CSI is used to ensure high-reliability and high-rate communication. For example, a transmit end may determine a modulation and coding scheme (MCS) based on a channel quality indicator (CQI) in CSI fed back by a receive end. For another example, a transmit end may determine a precoding matrix based on a rank indicator (RI) and a precoding matrix indicator (PMI) that are in CSI fed back by a receive end.

Therefore, obtaining of accurate CSI facilitates determining of a proper MCS, a proper precoding matrix, or the like to process a signal, to improve signal transmission quality, thereby helping reduce interference between users and improve system performance.

SUMMARY

This application provides a communication method, a terminal device, and a network device, to improve accuracy of CSI measurement.

According to a first aspect, a communication method is provided. The communication method includes:

A terminal device receives first indication information from a network device, where the first indication information is used to determine a first transmission scheme assumed for the terminal device to perform interference measurement.

The terminal device sends channel state information CSI, where the CSI is obtained by performing CSI measurement based on at least the first transmission scheme and a second transmission scheme, and the second transmission scheme is a transmission scheme assumed for the terminal device to perform channel measurement.

Based on the foregoing technical solution, the terminal device may perform CSI measurement based on the first transmission scheme assumed for the interference measurement and the second transmission scheme assumed for the channel measurement. CSI measurement is performed based on different assumed transmission schemes, so that impact of the first transmission scheme or the second transmission scheme on the CSI measurement can be considered. This helps improve accuracy of the CSI measurement, thereby helping improve data transmission quality, reduce interference between users, and improve system performance.

In this embodiment of this application, the network device may directly indicate the first transmission scheme to the terminal device, or may indirectly indicate the first transmission scheme to the terminal device.

With reference to the first aspect, in some possible implementations, the first indication information is used to indicate the first transmission scheme, the first transmission scheme corresponds to a first resource, and the first resource is a CSI-RS resource for interference measurement.

In other words, the first transmission scheme may be directly indicated by using signaling. Because the first transmission scheme corresponds to the first resource, the terminal device may receive, on the first resource, a CSI-RS for interference measurement, and perform CSI measurement based on the first transmission scheme corresponding to the first resource.

With reference to the first aspect, in some possible implementations, the first indication information is used to indicate a mapping relationship between a first port group and the first transmission scheme, and the mapping relationship between the first port group and the first transmission scheme includes a correspondence between at least one port included in the first port group and at least one type of transmission scheme.

The at least one port is a port for sending a first channel state information reference signal (CSI-RS), and the first CSI-RS is a CSI-RS for interference measurement.

It should be understood that a port may be a dimension of a resource. The first resource may include the first port group. The first port group may include the at least one port, and the at least one port may be a port for sending the first CSI-RS. When the first port group includes a plurality of ports, some ports in the first port group may correspond to one type of transmission scheme, and the other ports in the first port group may correspond to another type of transmission scheme. In other words, the mapping relationship of the first transmission scheme may include a correspondence between a plurality of ports and one or more types of transmission schemes. Therefore, a plurality of ports included in the first resource may correspond to more types of transmission schemes by mapping a port to a transmission scheme. In other words, there may be one or more types of first transmission schemes assumed for the terminal device to perform interference measurement.

With reference to the first aspect, in some possible implementations, the first indication information is used to indicate a first resource, and the first resource is a CSI-RS resource for interference measurement.

The method further includes:

The terminal device determines, based on a pre-obtained mapping relationship, the first transmission scheme corresponding to the first resource, where the mapping relationship is used to indicate a correspondence between at least one group of resources and at least one type of transmission scheme.

In other words, the first transmission scheme may be indirectly indicated by using signaling. The terminal device may determine, based on the pre-obtained mapping relationship, the first transmission scheme corresponding to the first resource indicated by using the first indication information.

Further, the first resource includes a first port group, the first port group includes one or more ports for sending a first CSI-RS, and the first CSI-RS is a CSI-RS for interference measurement.

The mapping relationship is used to indicate a correspondence between at least one port and at least one type of transmission scheme.

Therefore, a plurality of ports included in the first resource may correspond to more types of transmission schemes by mapping the first port group to the first transmission scheme. In other words, there may be one or more types of first transmission schemes assumed for the terminal device to perform interference measurement.

In this implementation, a mapping relationship between a resource and a transmission scheme may be predefined, for example, defined in a protocol; or may be indicated by the network device to the terminal device in advance.

Optionally, the method further includes:

The terminal device receives indication information of the mapping relationship from the network device.

To be specific, the network device indicates the mapping relationship to the terminal device in advance. The mapping relationship may be semi-statically configured, or may be dynamically configured.

Optionally, the mapping relationship is defined in a protocol.

To be specific, the mapping relationship may be statically configured.

With reference to the first aspect, in some possible implementations, the method further includes:

The terminal device receives second indication information from the network device, where the second indication information is used to determine the second transmission scheme assumed for the terminal device to perform channel measurement.

The network device may indicate, to the terminal device in a same manner, the second transmission scheme assumed for the channel measurement. Alternatively, the network device may indicate, to the terminal device by using a method similar to that in an existing LTE protocol, the second transmission scheme assumed for the channel measurement. This is not limited in this application.

According to a second aspect, a communication method is provided. The method includes:

A network device sends first indication information to a terminal device, where the first indication information is used to determine a first transmission scheme assumed for the terminal device to perform interference measurement.

The network device receives channel state information CSI from the terminal device, where the CSI is obtained by performing CSI measurement based on at least the first transmission scheme and a second transmission scheme, and the second transmission scheme is a transmission scheme assumed for the terminal device to perform channel measurement.

Based on the foregoing technical solution, the terminal device may perform CSI measurement based on the first transmission scheme assumed for the interference measurement and the second transmission scheme assumed for the channel measurement. CSI measurement is performed based on different assumed transmission schemes, so that impact of the first transmission scheme or the second transmission scheme on the CSI measurement can be considered. This helps improve accuracy of the CSI measurement, thereby helping improve data transmission quality, reduce interference between users, and improve system performance.

In this embodiment of this application, the network device may directly indicate the first transmission scheme to the terminal device, or may indirectly indicate the first transmission scheme to the terminal device.

With reference to the second aspect, in some possible implementations, the first indication information is used to indicate the first transmission scheme, the first transmission scheme corresponds to a first resource, and the first resource is a CSI-RS resource for interference measurement.

In other words, the first transmission scheme may be directly indicated by using signaling.

With reference to the second aspect, in some possible implementations, the first indication information is used to indicate a mapping relationship between a first port group and the first transmission scheme, and the mapping relationship between the first port group and the first transmission scheme includes a correspondence between at least one port included in the first port group and at least one type of transmission scheme.

The at least one port is a port for sending a first CSI-RS, and the first CSI-RS is a CSI-RS for interference measurement.

It should be understood that a port may be a dimension of a resource. The first resource includes the first port group. The first port group may include the at least one port, and the at least one port may be used to send the first CSI-RS. When the first port group includes a plurality of ports, some ports in the first port group may correspond to one type of transmission scheme, and the other ports in the first port group may correspond to another type of transmission scheme. In other words, the mapping relationship of the first transmission scheme may include a correspondence between a plurality of ports and one or more types of transmission schemes. Therefore, the plurality of ports included in the first port group may correspond to more types of transmission schemes by mapping a port to a transmission scheme. In other words, there may be one or more types of first transmission schemes assumed for the terminal device to perform interference measurement.

With reference to the second aspect, in some possible implementations, the first indication information is used to indicate a first resource, and the first resource is a CSI-RS resource for interference measurement.

The method further includes:

The network device sends indication information of a mapping relationship to the terminal device, where the mapping relationship is used to indicate a correspondence between at least one group of resources and at least one type of transmission scheme.

In other words, the first transmission scheme may be indirectly indicated by using signaling. The terminal device may determine, based on the pre-obtained mapping relationship, the first transmission scheme corresponding to the first resource indicated by using the first indication information.

Further, the first resource includes a first port group, the first port group includes one or more ports for sending a first CSI-RS, and the first CSI-RS is a CSI-RS for interference measurement.

The mapping relationship is used to indicate a correspondence between at least one port and at least one type of transmission scheme.

Therefore, a plurality of ports may correspond to a plurality of types of transmission schemes by mapping the first port group to the first transmission scheme. In other words, there may be one or more types of first transmission schemes assumed for the terminal device to perform interference measurement.

With reference to the second aspect, in some possible implementations, the method further includes:

The network device sends second indication information to the terminal device, where the second indication information is used to determine the second transmission scheme assumed for the terminal device to perform channel measurement.

The network device may indicate, to the terminal device in a same manner, the second transmission scheme assumed for the channel measurement. Alternatively, the network device may indicate, to the terminal device by using a method similar to that in an existing LTE protocol, the second transmission scheme assumed for the channel measurement. This is not limited in this application.

According to a third aspect, a terminal device is provided. The terminal device has a function of implementing behavior of the terminal device in the method designs of the first aspect. The functions may be implemented by hardware, or may be implemented by hardware executing corresponding software. The hardware or the software includes one or more units corresponding to the foregoing functions.

According to a fourth aspect, a network device is provided. The network device has a function of implementing behavior of the network device in the method designs of the second aspect. The functions may be implemented by hardware, or may be implemented by hardware executing corresponding software. The hardware or the software includes one or more units corresponding to the foregoing functions.

According to a fifth aspect, a terminal device is provided. The terminal device includes a transceiver and a processor. Optionally, the terminal device further includes a memory. The processor is configured to control the transceiver to send and receive a signal. The memory is configured to store a computer program. The processor is configured to invoke the computer program from the memory and run the computer program, so that the terminal device performs the method according to any one of the first aspect or the possible implementations of the first aspect.

According to a sixth aspect, a network device is provided. The network device includes a transceiver and a processor. Optionally, the network device further includes a memory. The processor is configured to control the transceiver to send and receive a signal. The memory is configured to store a computer program. The processor is configured to invoke the computer program from the memory and run the computer program, so that the network device performs the method according to any one of the second aspect or the possible implementations of the second aspect.

According to a seventh aspect, a communications system is provided. The system includes the terminal device according to any one of the third aspect or the possible implementations of the third aspect and the network device according to any one of the fourth aspect or the possible implementations of the fourth aspect; or the system includes the terminal device according to any one of the fifth aspect or the possible implementations of the fifth aspect and the network device according to any one of the sixth aspect or the possible implementations of the sixth aspect.

According to an eighth aspect, a communications apparatus is provided. The communications apparatus may be the terminal device in the foregoing method designs, or may be a chip disposed in the terminal device. The communications apparatus includes a processor. The processor is coupled to a memory, and may be configured to execute an instruction in the memory, to implement the method performed by the terminal device according to any one of the first aspect or the possible implementations of the first aspect. Optionally, the communications apparatus further includes the memory. Optionally, the communications apparatus further includes a communications interface, and the processor is coupled to the communications interface.

When the communications apparatus is a terminal device, the communications interface may be a transceiver or an input/output interface.

When the communications apparatus is a chip disposed in a terminal device, the communications interface may be an input/output interface.

Optionally, the transceiver may be a transceiver circuit. Optionally, the input/output interface may be an input/output circuit.

According to a ninth aspect, a communications apparatus is provided. The communications apparatus may be the network device in the foregoing method designs, or may be a chip disposed in the network device. The communications apparatus includes a processor. The processor is coupled to a memory, and may be configured to execute an instruction in the memory, to implement the method performed by the network device according to any one of the second aspect or the possible implementations of the second aspect. Optionally, the communications apparatus further includes the memory. Optionally, the communications apparatus further includes a communications interface, and the processor is coupled to the communications interface.

When the communications apparatus is a network device, the communications interface may be a transceiver or an input/output interface.

When the communications apparatus is a chip disposed in a network device, the communications interface may be an input/output interface.

Optionally, the transceiver may be a transceiver circuit. Optionally, the input/output interface may be an input/output circuit.

According to a tenth aspect, a computer program product is provided. The computer program product includes computer program code; and when the computer program code is run on a computer, the computer is enabled to perform the method according to any one of the foregoing aspects.

According to an eleventh aspect, a computer-readable medium is provided. The computer-readable medium stores computer program code; and when the computer program code is run on a computer, the computer is enabled to perform the method according to any one of the foregoing aspects.

In some possible implementations, the first transmission scheme is any one of the following: space time diversity, space frequency diversity, resource element (RE)-level precoder cycling, or closed loop spatial multiplexing.

In some possible implementations, the second transmission scheme is any one of the following: the space time diversity, the space frequency diversity, the RE-level precoder cycling, or the closed loop spatial multiplexing.

In some possible implementations, the first indication information is carried in a radio resource control (RRC) message.

DETAILED DESCRIPTION OF ILLUSTRATIVE EMBODIMENTS

The following describes the technical solutions of this application with reference to the accompanying drawings. The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, and a future 5th generation (5G) system or a new radio (NR) system.

Figure 1:
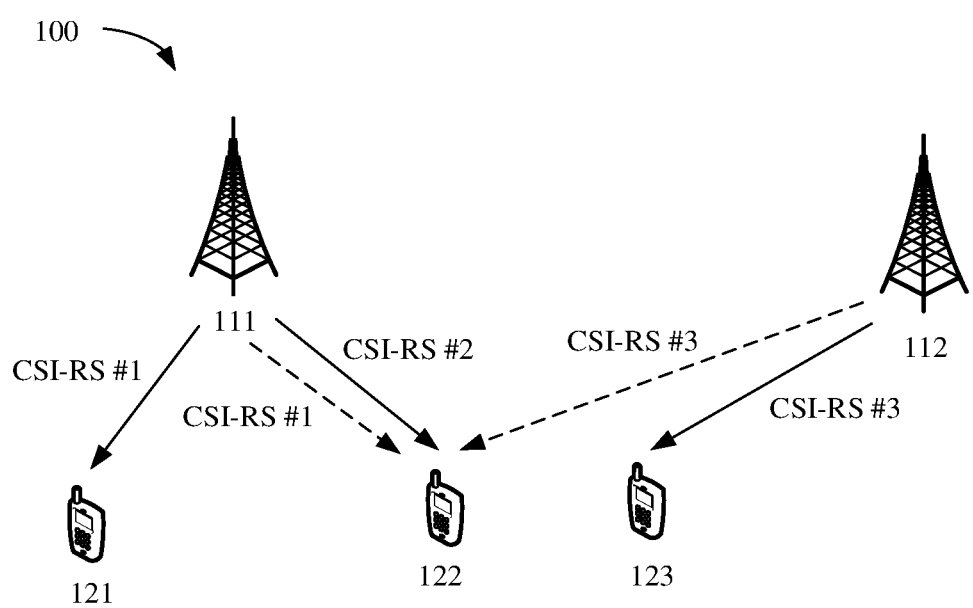
FIG. 1 is a schematic diagram of a wireless communications system according to an embodiment of this application.

For ease of understanding the embodiments of this application, a communications system shown in FIG. 1 is first used as an example to describe in detail a communications system applicable to the embodiments of this application. FIG. 1 is a schematic diagram of a wireless communications system 100 according to an embodiment of this application. As shown in the figure, the wireless communications system 100 may include at least one network device, for example, a network device #1 111 and a network device #2 112 shown in FIG. 1. The wireless communications system 100 may further include at least one terminal device, for example, a terminal device #1 121, a terminal device #2 122, and a terminal device #3 123 shown in FIG. 1. A plurality of antennas may be configured for each of the foregoing network devices and terminal devices. A network device and a terminal device may communicate with each other through a multi-antenna technology.

In the wireless communications system 100, it is assumed that the terminal device #1 121 and the terminal device #2 122 may be attached to the network device #1 111, the network device #1 111 may be a network device serving a cell #1, and in this case, the terminal device #1 121 and the terminal device #2 122 may be terminal devices in the cell #1; the terminal device #3 123 may be attached to the network device #2 112, the network device #2 112 may be a network device serving a cell #2, and in this case, the terminal device #3 123 may be a terminal device in the cell #2.

It should be understood that the network device in the wireless communications system may be any device that has a wireless transceiver function. The device includes but is not limited to: an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, a transmission point (TP), a transmission reception point (transmission and reception point, TRP), or the like; or may be a gNB or a transmission point (TRP or TP) in a 5G system such as an NR system, or one antenna panel or a group of antenna panels (including a plurality of antenna panels) of a base station in a 5G system; or may be a network node, such as a baseband unit (BBU) or a distributed unit (DU), that constitutes a gNB or a transmission point.

In some deployments, a gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling, for example, RRC layer signaling, may also be considered as being sent by the DU or by the DU and the CU. It may be understood that the network device may be a CU node, a DU node, or a device including a CU node and a DU node. In addition, the CU may be classified as a network device in radio access network (RAN), or may be classified as a network device in a core network (CN). This is not limited in this application.

It should be further understood that the terminal device in the wireless communications system may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device in the embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

FIG. 1 shows the network device #1 111, the terminal device #1 121 and the terminal device #2 122 in the cell #1, the network device #2 122, and the terminal device #3 123 in the cell #2 as an example merely for ease of understanding. However, this should not constitute any limitation on this application. The wireless communications system may further include more or fewer network devices, and may further include more or fewer terminal devices. Different terminal devices may communicate with a same network device or different network devices, and may communicate with a same quantity of network devices or different quantities of network devices. This is not limited in this application.

After being attached to a cell, a terminal device may receive a CSI-RS from a network device serving the cell, to perform CSI measurement and feedback on a downlink channel. CSI may include but is not limited to a precoding matrix indicator (PMI), a rank indicator (RI), a channel quality indicator (CQI), a layer indicator (LI), and the like. This is not limited in this application.

The network device may determine, based on a CQI fed back by the terminal device, an MCS corresponding to channel quality, to perform coding and modulation on a to-be-sent signal. For example, the network device may determine, based on a predefined correspondence between a CQI and an MCS, the MCS corresponding to the currently fed back CQI. The network device may further determine, based on an RI and a PMI that are fed back by the terminal device, a precoding matrix adapted to the channel quality, to precode the to-be-sent signal.

When performing CSI measurement and feedback, the terminal device may receive, on a CSI-RS resource for channel measurement, a CSI-RS for channel measurement; and may further receive, on a CSI-RS resource for interference measurement, a CSI-RS for interference measurement.

For example, in the wireless communications system shown in FIG. 1, when receiving a CSI-RS (denoted as a CSI-RS #1 for ease of differentiation and description) sent by the network device #1 111, the terminal device #1 121 may further receive a CSI-RS (denoted as a CSI-RS #2 for ease of differentiation and description) sent by the network device #1 111 to the terminal device #2 122. For the terminal device #1 121, the CSI-RS #1 may be considered as a CSI-RS for channel measurement, and the CSI-RS #2 may be considered as a CSI-RS for interference measurement. During CSI measurement, for example, during CQI calculation, the CSI-RS #1 may be used as a target signal, and the CSI-RS #2 may be used as an interference signal, to calculate a signal to interference plus noise ratio (SINR).

For another example, when receiving a CSI-RS (namely, the CSI-RS #2) sent by the network device #1, the terminal device #2 122 may further receive a CSI-RS (denoted as a CSI-RS #3 for ease of differentiation and description) sent by the network device #2 to the terminal device #3 123. For the terminal device #2 122, the CSI-RS #2 may be considered as a CSI-RS for channel measurement, and the CSI-RS #3 may be considered as a CSI-RS for interference measurement. During CSI measurement, for example, during CQI calculation, the CSI-RS #1 may be used as a target signal, and the CSI-RS #2 may be used as an interference signal, to calculate an SINR.

It should be noted that a CSI-RS for interference measurement that is received by a terminal device may not be a CSI-RS used by another terminal device to perform channel measurement. To be specific, the CSI-RS #2 shown in FIG. 1 may be a CSI-RS for interference measurement that the network device #1 111 instructs the terminal device #1 121 to receive, but the CSI-RS #2 may not be a CSI-RS used by the terminal device #2 to perform channel measurement. Alternatively, the CSI-RS #3 shown in FIG. 1 may be a CSI-RS for interference measurement that the network device #1 111 instructs the terminal device #2 122 to receive, but the CSI-RS #3 may not be a CSI-RS used by the terminal device #3 to perform channel measurement.

A network device may indicate a CSI-RS resource for channel measurement to a terminal device, and the terminal device may receive, on the CSI-RS resource for channel measurement, a CSI-RS for channel measurement. The network device may further indicate a CSI-RS resource for interference measurement to the terminal device, and the terminal device may receive, on the CSI-RS resource for interference measurement, a CSI-RS for interference measurement. In other words, a CSI-RS is based on a terminal device, namely, is UE-specific (UE specific).

It should be understood that the terminal device may report a CQI based on an SINR obtained through measurement, for example, report a CQI of a subband based on an SINR of the subband, or report a CQI of wideband based on an SINR of the wideband. This is not limited in this application.

With development of a MIMO technology, a plurality of types of transmission schemes have been proposed currently, for example, closed loop spatial multiplexing (CLSM) and transmit diversity (TD). The transmit diversity may specifically include but is not limited to: space frequency transmit diversity (SFTD, or referred to as space frequency block coding (SFBC)), space time transmit diversity (STTD, or referred to as space time block coding (STBC)), RE-level precoder cycling, and the like.

For ease of understanding this application, the following first briefly describes several concepts in this application.

1. Transmission scheme: also referred to as a transmission mode, which may be a transmission scheme defined in an LTE protocol or an NR protocol. The transmission scheme may be used to represent a technical scheme used for data transmission. It should be understood that the transmission scheme is merely a name, and in this application, the transmission scheme may be replaced with another name in a future protocol.

2. Spatial multiplexing: When a radio channel has relatively good quality and a rank of a channel matrix is greater than 1, a plurality of transmit antennas and a plurality of receive antennas may be used to send a plurality of pieces of data in parallel in a MIMO system, and the plurality of pieces of data sent in parallel are different, so that a data transmission throughput can be improved.

3. Closed loop spatial multiplexing: which may also be referred to as a transmission scheme 1 (TS 1) in the NR protocol. When transmitting a plurality of data streams in parallel, a transmit end may determine a corresponding precoding matrix based on CSI, especially a PMI and an RI, of a downlink channel, and separately precode and then transmit the plurality of to-be-sent data streams. It should be noted that the closed loop spatial multiplexing further includes transmitting one data stream through only one antenna port.

The CSI of the downlink channel may be fed back by a receive end based on a reference signal, or may be obtained by the transmit end by measuring an uplink channel based on reciprocity between the uplink channel and the downlink channel, or may be obtained by combining reciprocity between an uplink channel and the downlink channel and a feedback from a receive end. This is not limited in this application.

4. Transmit diversity: When a radio channel has relatively poor quality or there is only one receive antenna at a receive end, a plurality of transmit antennas may be used to send a plurality of pieces of same data in parallel in a MIMO system, so that data transmission reliability can be improved. Diversity means that one signal is divided into a plurality of signals; and the plurality of signals are sent at different time, at different frequencies, or in different space, and then are combined by the receive end in a centralized manner. When some signals are deeply faded, some other signals may be lightly faded, and there is a low probability that all the signals are deeply faded at the same time. Therefore, a probability of deep fading of a combined signal is greatly reduced. In other words, the transmit diversity may be understood as reducing a probability of deep fading of a combined signal by using a plurality of independent faded signals, thereby helping obtain a diversity gain.

Sending of a plurality of signals at different time may be referred to as time diversity. Sending of a plurality of signals at different frequencies may be referred to as frequency diversity. Sending of a plurality of signals in different space may be referred to as space diversity.

5. Space frequency block coding: a space frequency transmit diversity scheme proposed by combining space diversity and frequency diversity. At least two symbol streams may be obtained after layer mapping and Alamouti coding are performed on a modulated symbol stream, and then the at least two symbol streams are precoded and sent.

Specifically, it is assumed that the modulated symbol stream is s, and may be mapped to at least two layers after layer mapping; and symbol streams obtained after the layer mapping may be represented as, for example, $$\begin{bmatrix} s_1 \\ s_2 \end{bmatrix}.$$

In this case, two symbol streams obtained after a transmit diversity operation is performed on the two layer-mapping spatial layers may be represented as $$\begin{bmatrix} s_1 & -s_2^* \\ s_2 & s_1^* \end{bmatrix}.$$

That is, $s_1$ and $s_2$ are sent on the first subcarrier through the first antenna and the second antenna respectively, and $-s_2^*$ and $s_1^*$ are sent on the second subcarrier through the first antenna and the second antenna respectively. Correspondingly, it may be assumed that a signal $r_1$ is received by the receive end on the first subcarrier, and a signal $r_2$ is received by the receive end on the second subcarrier. The receive end may determine $s_1$ and $s_2$ based on the received signals $r_1$ and $r_2$.

Optionally, the two symbol streams obtained after the transmit diversity operation is performed may alternatively be expressed as $$\begin{bmatrix} s_1 & s_2 \\ -s_2^* & s_1^* \end{bmatrix}.$$

That is, $s_1$ and $s_2$ are sent on the first subcarrier through the first antenna and the second antenna respectively, and $s_2$ and $s_1^*$ are sent on the second subcarrier through the first antenna and the second antenna respectively.

6. Space time block coding: a space time transmit diversity scheme proposed by combining space diversity and time diversity. The space time block coding is similar to the space frequency block coding. At least two symbol streams may be obtained after layer mapping and Alamouti coding are performed on a modulated symbol stream, and then the at least two symbol streams are precoded and sent.

Assuming that symbol streams obtained after the layer mapping and the Alamouti coding are performed are $$\begin{bmatrix} s_1 & -s_2^* \\ s_2 & s_1^* \end{bmatrix},$$

the transmit end may send $s_1$ and $s_2$ on the first time unit (for example, an orthogonal frequency division multiplexing (OFDM) symbol) through the first antenna and the second antenna respectively, and send $-s_2^*$ and $s_1^*$ on the second time unit through the first antenna and the second antenna respectively. Correspondingly, it may be assumed that a signal $r_1$ is received by the receive end on the first time unit, and a signal $r_2$ is received by the receive end on the second time unit. The receive end may determine $s_1$ and $s_2$ based on the received signals $r_1$ and $r_2$.

Optionally, the two symbol streams obtained after the transmit diversity operation is performed may alternatively be expressed as $$\begin{bmatrix} s_1 & s_2 \\ -s_2^* & s_1^* \end{bmatrix}.$$

That is, $s_1$ and $-s_2$ are sent on the first time unit through the first antenna and the second antenna respectively, and $s_2$ and $s_1^*$ are sent on the second time unit through the first antenna and the second antenna respectively.

7. Precoder cycling: In a signal transmission process, precoding matrices may be determined at different time-frequency resource granularities, and a signal is precoded based on the precoding matrices corresponding to the different time-frequency resource granularities. In the embodiments of this application, a size of a resource for which a same precoding vector (or a same precoding matrix) is continuously used may be referred to as a precoder cycling granularity. The precoding vector and the precoding matrix are for one or more demodulation reference signal (DMRS) ports, and each column vector in the precoding matrix may correspond to one DMRS port.

On one time-frequency resource corresponding to a precoder cycling granularity, each DMRS port may correspond to a same precoding vector. On any two consecutive time-frequency resources corresponding to a precoder cycling granularity, a same DMRS port may correspond to different precoding vectors. It should be noted that "consecutive" herein may be "consecutive" in time domain or in frequency domain, and for example, the two consecutive time-frequency resources are physical resource blocks (PRB). Alternatively, two time-frequency resources are merely adjacent in a scheduling process and are not consecutive in resource distribution, and for example, are virtual resource blocks (VRB).

Based on different precoder cycling granularities, the precoder cycling may be classified into RB-level precoder cycling and RE-level precoder cycling. In the RB-level precoder cycling, a same DMRS port may correspond to one precoding vector on one RB, and may correspond to different precoding vectors on two consecutive RBs. The precoding vector may be cyclically used in a periodicity of a plurality of RBs. In the RE-level precoder cycling, a same DMRS port may correspond to one precoding vector on one RE, and may correspond to different precoding vectors on two consecutive REs. The precoding vector may be cyclically used in a periodicity of a plurality of REs. One DMRS port may correspond to at least two precoding vectors in a same precoder cycling periodicity.

It should be understood that an RB and an RE are merely two possible precoder cycling granularities, and should not constitute any limitation on this application. The precoder cycling granularity is not limited in this application. It should be noted that, in the embodiments of this application, the RB-level precoder cycling may be used as a possible implementation of the closed loop spatial multiplexing. Therefore, in the embodiments shown below, unless otherwise specified, the RB-level precoder cycling may be understood as a specific implementation of the closed loop spatial multiplexing, and the RE-level precoder cycling may be used as a transmission scheme.

8. Port: also referred to as an antenna port. The port may be understood as a transmit antenna identified by a receive end, or a transmit antenna that can be distinguished in space. One antenna port may be configured for each virtual antenna, each virtual antenna may be a weighted combination of a plurality of physical antennas, and each antenna port may correspond to one reference signal. Therefore, each antenna port may be referred to as a reference signal port, for example, a DMRS port or a CSI-RS port.

9. CSI-RS: a reference signal available for CSI measurement of a downlink channel. In the NR protocol, the CSI-RS may include a non-zero power (NZP) CSI-RS and a zero power (ZP) CSI-RS. The NZP CSI-RS may include a CSI-RS for channel measurement and an NZP CSI-RS for interference measurement. For a terminal device, a CSI-RS for channel measurement may be understood as a target signal, and a CSI-RS for interference measurement may be understood as an interference signal. The ZP CSI-RS may include a CSI-RS for interference measurement. Usually, the ZP CSI-RS may be used to measure interference from a neighboring cell. The architecture in FIG. 1 is used as an example, and it is assumed that the terminal device #2 122 needs to perform CSI measurement on a downlink channel between the terminal device #2 122 and the network device #1 111. In this case, the terminal device #2 122 may receive, from the network device #1 111, the CSI-RS #2 for channel measurement, and may further receive, from the network device #1 111, the CSI-RS #1 for interference measurement and/or receive, from the network device #2 112, the CSI-RS #3 for interference measurement.

It can be learned from the foregoing example that, in the NZP CSI-RS, the CSI-RS for channel measurement and the CSI-RS for interference measurement are relative to the terminal device. If the network device indicates, to the terminal device, that a resource is a CSI-RS resource for channel measurement, a CSI-RS received by the terminal device on the resource is a CSI-RS for channel measurement. If the network device indicates, to the terminal device, that another resource is a CSI-RS resource for interference measurement, a CSI-RS received by the terminal device on the resource is a CSI-RS for interference measurement. In other words, a CSI-RS is based on a terminal device, namely, is UE-specific. A same CSI-RS may be a CSI-RS for channel measurement for a terminal device, and may be a CSI-RS for interference measurement for another terminal device.

It should be understood that the CSI-RS is a reference signal for CSI measurement of a downlink channel, but should not constitute any limitation on this application. In this application, another reference signal may be defined in a future protocol or another existing reference signal may be used to implement a function the same as or similar to that of the CSI-RS. For example, a DMRS is used to perform CSI measurement.

10. CSI-RS resource: a resource used to transmit a CSI-RS. The CSI-RS resource may include, for example, a time-frequency resource or a port. The CSI-RS resource may include a resource for channel measurement, for example, an NZP CSI-RS resource for channel measurement; and may further include a resource for interference measurement, for example, an NZP CSI-RS resource for interference measurement or a ZP CSI-RS resource for interference measurement. The ZP CSI-RS resource may be referred to as a CSI-interference measurement (CSI-IM) resource (CSI-IM resource) in the NR protocol, and is referred to as a CSI-IM resource for short below for ease of description.

In addition, it should be noted that in this application, an upper corner mark H represents conjugate transpose. For example, $A^H$ represents conjugate transpose of a matrix (or a vector) A. An upper corner mark * represents a conjugate. For example, B* represents a conjugate of a matrix (or a vector) B. ^ represents an estimated value. For example, $\hat{C}$ represents an estimated value of a matrix (or a vector) C. For brevity below, descriptions of a same or similar case is omitted.

With the development of the MIMO technology, the transmit diversity increasingly tends to be used as spatial multiplexing to improve resource utilization. The architecture shown in FIG. 1 is used as an example. On a same time-frequency resource, the terminal device #1 and the terminal device #2 may both use the transmission scheme of transmit diversity, to implement multi-user spatial multiplexing. Alternatively, on a same time-frequency resource, the terminal device #1 and the terminal device #2 may both use the transmission scheme of transmit diversity, and the terminal device #3 uses the transmission scheme of closed loop spatial multiplexing, to implement multi-user spatial multiplexing.

However, when some transmission schemes are used to transmit a signal, because signal processing manners are different, CSI obtained through measurement based on different assumed transmission schemes may also be different during CSI measurement.

Specifically, the terminal device may first estimate, based on a received CSI-RS, an equivalent channel vector corresponding to each port, and then determine a covariance matrix based on the equivalent channel vector. With reference to different transmission schemes, a specific process of determining the covariance matrix is described in detail below by using a minimum mean square error (MMSE)-interference rejection combining (IRC) receiver algorithm as an example.

When a transmission scheme assumed for the terminal device to perform channel measurement on a CSI-RS resource for channel measurement is the TS 1, and a transmission scheme assumed for the terminal device to perform interference measurement on a CSI-RS resource for interference measurement is also the TS 1, the terminal device may determine an interference covariance matrix in the following two possible implementations.

For ease of description, it is assumed that ports for CSI-RSs for interference measurement are a port #0 and a port #1.

In an implementation, the terminal device may first obtain, through measurement based on the CSI-RSs for interference measurement, equivalent channel vectors on each RE that correspond to the ports, for example, obtain estimated values $\hat{h}_{0,k}$ and $\hat{h}_{1,k}$ of equivalent channel vectors on a $k^{th}$ RE that respectively correspond to the port #0 and the port #1. A lower corner mark k represents the $k^{th}$ RE in a plurality of REs included at a CSI measurement granularity (where for example, an entire bandwidth is used as a granularity during wideband measurement, and a subband is used as a granularity during subband measurement). A value of k is 1≤k≤K, K represents a quantity of REs included at the CSI measurement granularity, and both k and K are integers. Lower corner marks 0 and 1 respectively correspond to the port 0 and the port 1. Then, the terminal device may average equivalent channel vectors corresponding to the K REs at the CSI measurement granularity, to obtain estimated values $\hat{h}_0$ and $\hat{h}_1$ of equivalent channel vectors respectively corresponding to the port #0 and the port #1. Subsequently, the terminal device may respectively calculate covariance matrices $\hat{h}_0\hat{h}_0^H$ and $\hat{h}_1\hat{h}_1^H$ based on the estimated values of the two equivalent channel vectors corresponding to the port #0 and the port #1.

In another implementation, the terminal device may first obtain, through measurement based on the CSI-RSs for interference measurement, equivalent channel vectors on each RE that correspond to the ports, for example, obtain estimated values $\hat{h}_{0,k}$ and $\hat{h}_{1,k}$ of equivalent channel vectors on a $k^{th}$ RE that respectively correspond to the port #0 and the port #1. A lower corner mark k represents the $k^{th}$ RE in a plurality of REs included at a CSI measurement granularity (where for example, an entire bandwidth is used as a granularity during wideband measurement, and a subband is used as a granularity during subband measurement). A value of k is 1≤k≤K, K represents a quantity of REs included at the CSI measurement granularity, and both k and K are integers. Lower corner marks 0 and 1 respectively correspond to the port 0 and the port 1. Then, the terminal device may respectively calculate covariance matrices based on estimated values of equivalent channel vectors obtained through measurement on each RE based on the port #0 and the port #1, to obtain covariance matrices $\hat{h}_{0,k}\hat{h}_{0,k}^H$ and $\hat{h}_{1,k}\hat{h}_{1,k}^H$ on the $k^{th}$ RE that respectively correspond to the port #0 and the port #1. Subsequently, the terminal device may average covariance matrices that are on the K REs at the CSI measurement granularity and that correspond to the port #0 and the port #1, to obtain covariance matrices $E(\hat{h}_{0,k}\hat{h}_{0,k}^H)$ and $E(\hat{h}_{1,k}\hat{h}_{1,k}^H)$ respectively corresponding to the port #0 and the port #1. E represents an averaging operation.

When a transmission scheme assumed for the terminal device to perform channel measurement on a CSI-RS resource for channel measurement is the SFTD or the STTD, and a transmission scheme assumed for the terminal device to perform interference measurement on a CSI-RS resource for interference measurement is the SFTD or the STTD, the terminal device may determine a covariance matrix in the following two possible implementations.

For ease of description, it is assumed that ports for CSI-RSs for interference measurement are still the port #0 and the port #1.

In an implementation, the terminal device may first obtain, through measurement based on the CSI-RSs for interference measurement, equivalent channel vectors on each RE that correspond to the ports, for example, obtain estimated values $\hat{h}_{0,k}$ and $\hat{h}_{1,k}$ of equivalent channel vectors on a $k^{th}$ RE that respectively correspond to the port #0 and the port #1. A lower corner mark k represents the $k^{th}$ RE in a plurality of REs included at a CSI measurement granularity (where for example, an entire bandwidth is used as a granularity during wideband measurement, and a subband is used as a granularity during subband measurement). A value of k is 1≤k≤K, K represents a quantity of REs included at the CSI measurement granularity, both k and K are integers, and K is an even number. Lower corner marks 0 and 1 respectively correspond to the port 0 and the port 1.

When the transmission scheme is the SFTD or the STTD, the covariance matrix needs to be considered by combining two subcarriers of the two ports or two symbols of the two ports. Therefore, if symbol streams obtained after layer mapping and Alamouti coding are represented as $$\begin{bmatrix} s_1 & -s_2^* \\ s_2 & s_1^* \end{bmatrix},$$

the following matrix:

$$\hat{H}_l = \begin{bmatrix} \hat{h}_{0,k} & \hat{h}_{1,k} \\ \hat{h}_{1,k+1}^* & -\hat{h}_{0,k+1}^* \end{bmatrix}$$

may be constructed by using equivalent channel vectors corresponding to two REs of the two ports. The matrix may further be approximated to $$\begin{bmatrix} \hat{h}_{0,l} & \hat{h}_{1,l} \\ \hat{h}_{1,l}^* & -\hat{h}_{0,l}^* \end{bmatrix}.$$

$\hat{h}_{d,l}=\hat{h}_{d,k}$, $\hat{h}_{d,l}=\hat{h}_{d,k+1}$, or $$\hat{h}_{d,l} = \frac{\hat{h}_{d,k} + \hat{h}_{d,k+1}}{2}.$$

d=0 or 1.

$$l = \frac{k+1}{2},$$

1≤l≤K/2, and l represents an $l^{th}$ RE pair in the K REs included at the CSI measurement granularity. It may be understood that the K REs may include K/2 RE pairs. $\hat{H}_l$ represents a matrix constructed by using equivalent channel vectors corresponding to the $k^{th}$ RE and a $(k+1)^{th}$RE corresponding to the two ports. In the embodiments of this application, for ease of description, a matrix constructed by using equivalent channel vectors corresponding to two REs (in other words, one RE pair) is referred to as an equivalent channel matrix. The equivalent channel matrix is only for the transmission scheme of SFTD or STTD, is an equivalent channel matrix constructed by combining equivalent channel vectors of two ports, and is different from an equivalent channel matrix obtained through measurement based on a reference signal. Subsequently, the terminal device may average matrices corresponding to the K/2 RE pairs at the CSI measurement granularity, to obtain a matrix $$\hat{H} = \begin{bmatrix} \hat{h}_0 & \hat{h}_1 \\ \hat{h}_1^* & -\hat{h}_0^* \end{bmatrix}$$

corresponding to the port #0 and the port #1. Let $$\begin{bmatrix} \hat{h}_0 & \hat{h}_1 \\ \hat{h}_1^* & -\hat{h}_0^* \end{bmatrix} = [a_0 \ a_1].$$

Then, the terminal device may calculate covariance matrices $a_0 a_0^H$ and $a_1 a_1^H$ respectively based on the equivalent channel matrix corresponding to the port #0 and the port #1.

In another implementation, the terminal device may first obtain, through measurement based on the CSI-RSs for interference measurement, equivalent channel vectors on each RE that correspond to the ports, for example, obtain estimated values $\hat{h}_{0,k}$ and $\hat{h}_{1,k}$ of equivalent channel vectors on an $i^{th}$ RE that respectively correspond to the port #0 and the port #1. A lower corner mark k represents the $k^{th}$ RE in a plurality of REs included at a CSI measurement granularity (where for example, an entire bandwidth is used as a granularity during wideband measurement, and a subband is used as a granularity during subband measurement). A value of k is 1≤k≤K, K represents a quantity of REs included at the CSI measurement granularity, both k and K are integers, and K is an even number. Lower corner marks 0 and 1 respectively correspond to the port 0 and the port 1.

When the transmission scheme is the SFTD or the STTD, the covariance matrix needs to be considered by combining two subcarriers of the two ports or two symbols of the two ports. Therefore, the following matrix:

$$\hat{H}_l = \begin{bmatrix} \hat{h}_{0,k} & \hat{h}_{1,k} \\ \hat{h}_{1,k+1}^* & -\hat{h}_{0,k+1}^* \end{bmatrix}$$

may be constructed by using equivalent channel vectors corresponding to two REs of the two ports. The matrix may further be approximated to $$\begin{bmatrix} \hat{h}_{0,l} & \hat{h}_{1,l} \\ \hat{h}_{1,l}^* & -\hat{h}_{0,l}^* \end{bmatrix}.$$

Let $$\begin{bmatrix} \hat{h}_{0,l} & \hat{h}_{1,l} \\ \hat{h}_{1,l}^* & -\hat{h}_{0,l}^* \end{bmatrix} = [a_{0,l} \ a_{1,l}].$$

The terminal device may calculate, based on $\hat{H}_l$ corresponding to each RE, covariance matrices $a_{0,l}a_{0,l}^H$ and $a_{1,l}a_{1,l}^H$ respectively corresponding to the port #0 and the port #1. Then, the terminal device may average covariance matrices corresponding to the plurality of REs at the CSI measurement granularity, to obtain covariance matrices that may be $E(a_{0,l}a_{0,l}^H)$ and $E(a_{1,l}a_{1,l}^H)$ and that respectively correspond to the port #0 and the port #1.

It should be understood that the covariance matrices that correspond to the port #0 and the port #1 and that are calculated in the foregoing two implementations may be the same, or may be different. This is not limited in this application. In addition, in this application, the terminal device may alternatively determine, in another manner other than the foregoing listed manners, covariance matrices corresponding to different ports. For example, a covariance matrix is directly calculated based on $$\begin{bmatrix} \hat{h}_{0,l} & \hat{h}_{1,l} \\ \hat{h}_{1,l}^* & -\hat{h}_{0,l}^* \end{bmatrix}.$$

For another example, when a transmission scheme assumed for the terminal device to perform interference measurement on a CSI-RS resource for interference measurement is the RE-level precoder cycling, or a transmission scheme assumed for the terminal device to perform channel measurement on a CSI-RS resource for channel measurement is the RE-level precoder cycling, because precoding matrices used for two consecutive REs are different, equivalent channel vectors corresponding to the two consecutive REs are also different. In other words, when a transmission scheme is the RE-level precoder cycling, channel estimation needs to be performed on each RE, to determine an equivalent channel vector corresponding to each RE, and equivalent channel matrices or covariance matrices corresponding to a plurality of REs included at a CSI measurement granularity cannot be averaged.

It can be learned from the foregoing examples that when different transmission schemes are used, equivalent channel vectors obtained through measurement are used differently, and determined covariance matrices may also be different. Therefore, if impact of a transmission scheme is not considered, a result obtained through CSI measurement may be inaccurate. However, it should be understood that the foregoing examples describe, merely for ease of understanding, a difference caused by different transmission schemes in determining of a covariance matrix, but this should not constitute any limitation on this application. It can also be learned from the foregoing descriptions that, in different assumed transmission schemes, processing performed by the terminal device after the terminal device obtains an equivalent channel vector through measurement on a CSI-RS resource for channel measurement is also different.

In view of this, this application provides a communication method, to indicate, to a terminal device, a transmission scheme assumed for interference measurement, to perform CSI measurement based on the transmission scheme, thereby improving accuracy of the CSI measurement.

In the embodiments of this application, for ease of differentiation and description, CSI measurement in which a special equivalent channel matrix and a special interference covariance matrix do not need to be considered is referred to as conventional CSI measurement, and CSI measurement in which a special equivalent channel matrix or a special interference covariance matrix needs to be considered is referred to as special CSI measurement. It should be understood that whether CSI measurement is special may be determined based on both a transmission scheme assumed for channel measurement and a transmission scheme assumed for interference measurement.

The following describes the embodiments of this application in detail with reference to the accompanying drawings.

It should be understood that, in the embodiments described below, "first" and "second" are merely intended to distinguish between different objects, for example, distinguish between different transmission schemes, different CSI-RSs, different resources, different ports, and different indication information, and should not constitute any limitation on this application.

It should be further understood that, in the embodiments described below, "pre-obtaining" may include indication using signaling of a network device or predefinition, for example, predefinition in a protocol. "Predefinition" may be implemented by pre-storing corresponding code or a table in a device (for example, including a terminal device and a network device), or in another manner of indicating related information. A specific implementation of "predefinition" is not limited in this application.

It should be further understood that "storing" in the embodiments of this application may be storing in one or more memories. The one or more memories may be separately disposed, or may be integrated into an encoder or a decoder, a processor, or a communications apparatus. Alternatively, a part of the one or more memories may be separately disposed, and the other part of the one or more memories is integrated into a decoder, a processor, or a communications apparatus. The memory may be a storage medium in any form. This is not limited in this application.

It should be further understood that in the embodiments of this application, nouns "network" and "system" are usually interchangeably used, but meanings of the nouns may be understood by a person skilled in the art. The terms "of (of)", "corresponding or relevant", and "corresponding" may be mixedly used sometimes. It should be noted that meanings expressed by the terms are consistent when differences of the terms are not emphasized.

It should be further understood that in the embodiments of this application, a "protocol" may be a standard protocol in the communications field, and for example, may include an LTE protocol, an NR protocol, and a related protocol applied to a future communications system. This is not limited in this application.

It should be further understood that the term "and/or" describes an association relationship between associated objects and represents that three relationships may exist. For example, A and/or B may represent the following three cases: Only A exists, both A and B exist, and only B exists. The character "/" generally indicates an "or" relationship between associated objects. The term "at least one" means one or more. The term "at least one of A and B", similar to the term "A and/or B", describes an association relationship between associated objects and represents that three relationships may exist. For example, "at least one of A and B" may represent the following three cases: Only A exists, both A and B exist, and only B exists.

The technical solutions of this application may be applied to a wireless communications system, for example, the communications system 100 shown in FIG. 1. There may be a wireless communication connection between two communications apparatuses in the wireless communications system. One of the two communications apparatuses may correspond to the terminal device (for example, the terminal device #1 121, the terminal device #2 122, or the terminal device #3 123) shown in FIG. 1, and for example, may be the terminal device shown in FIG. 1, or may be a chip disposed in the terminal device. The other of the two communications apparatuses may correspond to the network device (for example, the network device #1 111 or the network device #2 112) shown in FIG. 1, and for example, may be the network device shown in FIG. 1, or may be a chip disposed in the network device.

Without loss of generality, the following describes the embodiments of this application in detail by using a process of interaction between a terminal device and a network device as an example. It may be understood that any terminal device in the wireless communications system or a chip disposed in a terminal device may perform CSI measurement and feedback by using a same method. This is not limited in this application.

Figure 2:
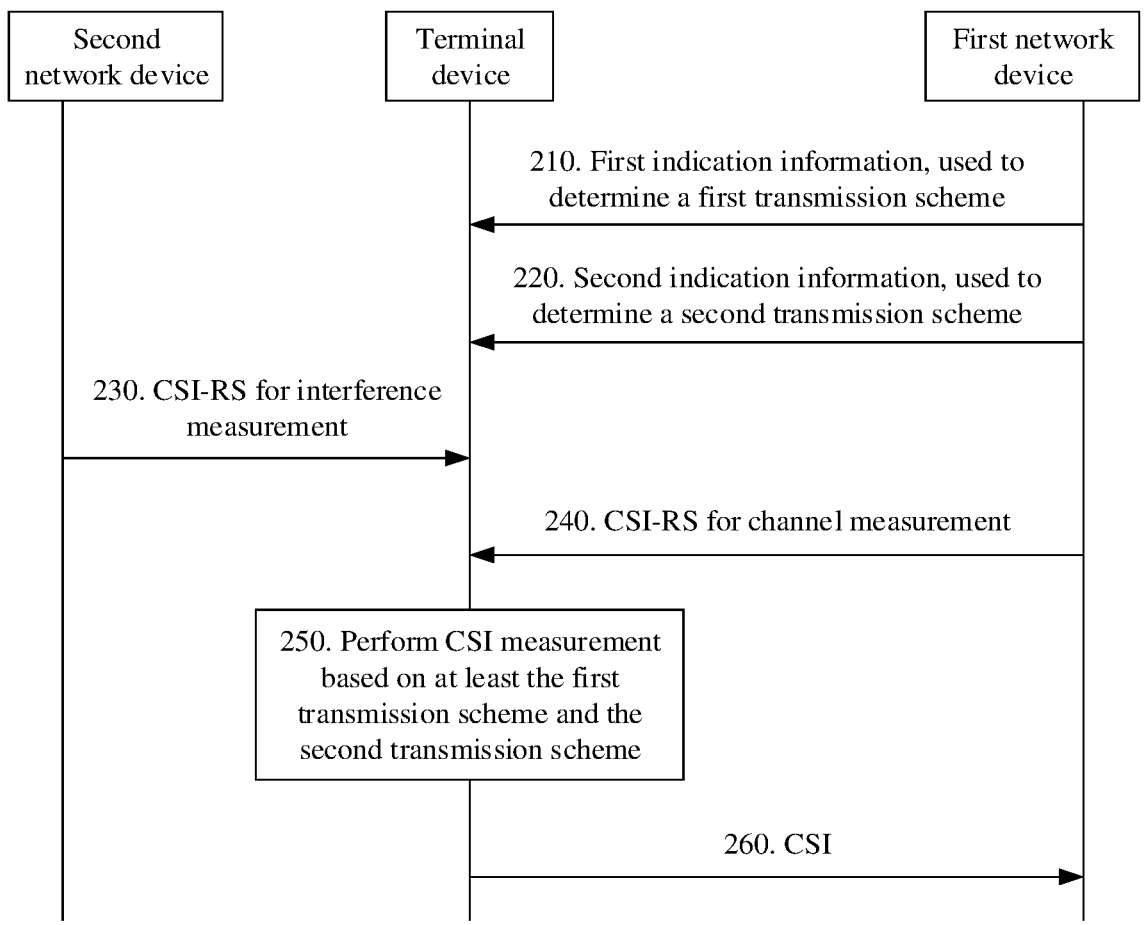
FIG. 2 is a schematic flowchart of a communication method according to an embodiment of this application.

FIG. 2 is a schematic flowchart of a communication method 200 from the perspective of device interaction. As shown in the figure, the method 200 shown in FIG. 2 may include step 210 to step 260. The following describes the communication method 200 in detail with reference to FIG. 2.

Step 210. A terminal device receives first indication information, where the first indication information is used to determine a transmission scheme assumed for the terminal device to perform interference measurement.

Correspondingly, in step 210, a first network device sends the first indication information, where the first indication information is used to determine the transmission scheme assumed for the terminal device to perform interference measurement.

In this embodiment of this application, for ease of differentiation and description, the transmission scheme assumed for interference measurement is denoted as a first transmission scheme. In contrast, a transmission scheme assumed for channel measurement is denoted as a second transmission scheme. It should be understood that the first transmission scheme and the second transmission scheme may be the same or may be different. This is not limited in this application.

It should be understood that the first transmission scheme may be used to represent a category of transmission schemes assumed for the terminal device to perform interference measurement, and is not limited to a type of transmission scheme. For example, in the architecture shown in FIG. 1, if the terminal device #2 122 performs CSI measurement on a downlink channel between the terminal device #2 122 and the network device #1 111, the terminal device #2 122 may assume that there is one or more types of transmission schemes for interference measurement. For example, a transmission scheme assumed for the terminal device to perform interference measurement based on the CSI-RS #1 sent by the network device #1 111 may be the same as or different from a transmission scheme assumed for the terminal device to perform interference measurement based on the CSI-RS #3 sent by the network device #2 112.

In addition, for ease of differentiation and description, a network device, at a transmit end, from which the terminal device receives a CSI-RS for channel measurement is denoted as the first network device, and a network device, at the transmit end, from which the terminal device receives a CSI-RS for interference measurement is denoted as a second network device. It may be understood that the first network device and the second network device may be a same network device or may be different network devices. This is not limited in this application.

In addition, the CSI-RS for interference measurement may be denoted as a first CSI-RS, a CSI-RS resource for interference measurement may be denoted as a first resource, and a port for sending the first CSI-RS on the first resource may be denoted as a first port group. The CSI-RS for channel measurement may be denoted as a second CSI-RS, a CSI-RS resource for channel measurement may be denoted as a second resource, and a port for sending the second CSI-RS on the second resource may be denoted as a second port group.

The first CSI-RS and the second CSI-RS may be transmitted on a same time-frequency resource or different time-frequency resources. In other words, the first resource and the second resource may include a same time-frequency resource or different time-frequency resources. This is not limited in this application. The terms "first" and "second" are merely used to distinguish between different functions, and should neither limit a quantity of sent CSI-RSs and a sequence of sending the CSI-RSs, nor limit a quantity of resources. For example, the first CSI-RS may be a CSI-RS that is sent by one network device and that corresponds to one or more ports, or may be CSI-RSs that are sent by a plurality of network devices. For another example, the second CSI-RS may be a CSI-RS that is sent by one network device and that corresponds to one or more ports, or may be CSI-RSs that are sent by a plurality of network devices and that correspond to a plurality of ports. For still another example, the first CSI-RS and the second CSI-RS may alternatively be CSI-RSs that are sent by a same network device and that respectively correspond to different ports.

In addition, the first port group may include one or more ports used to send the first CSI-RS. A quantity of first port groups may correspond to a quantity of first CSI-RSs.

It should be noted that the first transmission scheme and the second transmission scheme are merely transmission schemes that are assumed to be used by the network device during the CSI measurement. This does not mean that the network device is currently sending a signal (for example, a reference signal or a data signal) by using the transmission schemes. For example, when performing CSI measurement on the downlink channel between the terminal device #2 122 and the network device #1 111, the terminal device #2 122 in FIG. 1 may perform CSI measurement separately based on the first transmission scheme and the second transmission scheme. The foregoing has described by using examples that in different transmission schemes, covariance matrices obtained through measurement may be different. Therefore, when performing CSI measurement, the terminal device may predetermine the first transmission scheme assumed for interference measurement and the second transmission scheme assumed for channel measurement, to obtain accurate CSI.

In addition, in this application, the transmission scheme (that is, the second transmission scheme) assumed for the terminal device to perform channel measurement and a transmission scheme used for data transmission subsequently performed on a measured channel are not limited to a same transmission scheme, and the transmission scheme (that is, the first transmission scheme) assumed for the terminal device to perform interference measurement and the transmission scheme used for the data transmission subsequently performed on the measured channel are not limited to a same transmission scheme either.

In this embodiment of this application, the first network device may indicate the first transmission scheme to the terminal device at least in any one of the following three manners:

Manner 1: The first indication information is used to directly indicate the first transmission scheme.

Manner 2: The first indication information is used to directly indicate a correspondence between the first port group and the first transmission scheme.

Manner 3: The first indication information is used to indicate a resource corresponding to the first transmission scheme, so that the terminal device determines the first transmission scheme based on a correspondence between a resource and a transmission scheme.

With reference to the three manners, the following separately describes in detail a specific process in which the first network device sends the first indication information and the terminal device determines the first transmission scheme.

Manner 1

The first network device may indicate the first transmission scheme to the terminal device by using the first indication information.

Specifically, the first network device may indicate the first transmission scheme to the terminal device by using newly added signaling. For example, the first network device may indicate the first transmission scheme by using the newly added signaling, for example, higher layer signaling or physical layer signaling. Alternatively, the first network device may indicate the first transmission scheme to the terminal device by extending existing signaling.

The higher layer signaling may include, for example, a radio resource control (RRC) message or a media access control (MAC) control element (CE). The physical layer signaling may include, for example, downlink control information (DCI) or other signaling transmitted over a physical downlink control channel (PDCCH) or another downlink control channel. It should be understood that the higher layer signaling and the physical layer signaling listed above are merely examples, and should not constitute any limitation on this application. In this application, other higher layer signaling or physical layer signaling may be defined in a future protocol, and other names may be used for the foregoing listed signaling in a future protocol.

In a possible design, the first network device may indicate the first transmission scheme by extending a field in existing higher layer signaling.

For example, the higher layer signaling may be an RRC message. Each reporting setting in the RRC message may be used to configure, for the terminal device, a CSI resource setting for interference measurement. The CSI resource setting for interference measurement may include S (where Si, and S is an integer) NZP CSI-RS resource sets, and each NZP CSI-RS resource set may include K (where K≥1, and K is an integer) NZP CSI-RS resources.

A resource for the CSI resource setting may be configured by using a higher layer parameter CSI-ResourceConfig; or CSI-ResourceConfigId may be indicated in CSI-ReportConfig, and may be used to indicate one CSI resource setting for interference measurement, to be specific, one CSI resource setting for measurement is specified from a plurality of CSI resource settings. A resource for the NZP CSI-RS resource set may be configured by using a higher layer parameter NZP-CSI-RS-ResourceSetConfig. The NZP CSI-RS resource may be configured by using a higher layer parameter NZP-CSI-RS-ResourceConfig.

The higher layer parameters listed above may be used to configure corresponding time-frequency resources and quantities of ports for resources at different granularities.

When the first network device configures the CSI resource setting for the terminal device by using the higher layer signaling, the CSI resource setting carries S NZP CSI-RS resource sets, and some or all resources in the S NZP CSI-RS resource sets may be used to transmit a CSI-RS. When some resources in the S NZP CSI-RS resource sets are used to transmit a CSI-RS, the first network device may further indicate L (where 1≤L<S, and L is an integer) currently available NZP CSI-RS resource sets by using physical layer signaling such as DCI. For example, the S CSI resource sets in the CSI resource setting may correspond to S indexes (index), and the first network device may include, in the physical layer signaling, indexes of the L currently available NZP CSI-RS resource sets, to indicate the L currently available CSI resource sets to the terminal device.

The first network device may map one CSI resource setting to one type of transmission scheme. For example, an indication field of the first transmission scheme is added to CSI-ResourceConfig or CSI-ReportConfig. In another implementation, the first network device may map one NZP CSI-RS resource set to one type of transmission scheme. For example, an indication field of the first transmission scheme is added to NZP-CSI-RS-ResourceSetConfig. In still another implementation, the first network device may map one NZP CSI-RS resource to one type of transmission scheme, or map all ports included in one NZP CSI-RS resource to one type of transmission scheme. For example, an indication field of the first transmission scheme is added to NZP-CSI-RS-ResourceConfig.

In other words, the first resource may be resources at different granularities, for example, may be a resource configured in an NZP CSI-RS resource setting, or may be a resource configured in an NZP CSI-RS resource set, or may be an NZP CSI-RS resource, or may be all ports in an NZP CSI-RS resource. This is not limited in this application.

The indication field of the first transmission scheme may carry an identifier or an index of the first transmission scheme, and each identifier or index may be used to uniquely indicate one type of transmission scheme.

Manner 2

The first network device may indicate the mapping relationship between the first port group and the first transmission scheme to the terminal device by using the first indication information.

When the first resource includes a plurality of ports, in other words, when the first port group includes a plurality of ports, a port may be further mapped to a transmission scheme. For example, in the plurality of ports included in the first resource, different ports may correspond to different transmission schemes. For example, some ports may correspond to SFTD or STTD, and the other ports may correspond to a TS 1.

In other words, the mapping relationship between the first port group and the first transmission scheme may include a correspondence between the first port group and one or more types of transmission schemes. In other words, the mapping relationship between the first port group and the first transmission scheme may include a correspondence between at least one port included in the first port group and at least one type of transmission scheme. In Manner 2, the first network device may directly add a new field, for example, an indication field of a port number and an indication field of a corresponding transmission scheme, to the foregoing listed higher layer parameter used for resource configuration.

For example, it is assumed that one NZP CSI-RS resource includes four ports, and port numbers are, for example, a port #0 to a port #3. The port #0 and the port #1 correspond to the SFTD, and the port #2 and the port #3 correspond to the TS 1. For example, the first network device may add a new field to the higher layer parameter NZP-CSI-RS-ResourceConfig to indicate a port number and a corresponding transmission scheme.

In an implementation, the first network device may correspondingly indicate the port number and the transmission scheme. For example, indication fields of different port numbers may correspond to indication fields of different transmission schemes in a bitmap manner. For example, indication fields of the port #0 and the port #1 correspond to an indication field of the SFTD, and indication fields of the port #2 and the port #3 correspond to an indication field of the TS 1.

In another implementation, the first network device and the terminal device may pre-agree upon a mapping rule between a port number and a transmission scheme. For example, the mapping rule may be: sequentially mapping one type of transmission scheme to two ports in ascending order of port numbers. For example, when port numbers indicated in the higher layer parameter NZP-CSI-RS-ResourceConfig are a port #0 to a port #3, and transmission schemes are the TS 1 and the SFTD, the port number #0 and the port #1 may be mapped to the TS 1, and the port number #2 and the port number #3 may be mapped to the SFTD. For another example, the mapping rule is: When the first transmission scheme includes only one type of transmission scheme, the transmission scheme is mapped to all currently available ports. For example, when port numbers indicated in the higher layer parameter NZP-CSI-RS-ResourceConfig are a port #0 to a port #7, and a transmission scheme is the TS 1, the port number #0 to the port #7 may be mapped to the TS 1.

It should be understood that the foregoing listed specific manners of indicating the mapping relationship between the first port group and the first transmission scheme are merely examples for description, and should not constitute any limitation on this application.

The plurality of ports included in the first resource may correspond to more types of transmission schemes by mapping a port to a transmission scheme. In other words, there may be one or more types of first transmission schemes assumed for the terminal device to perform interference measurement.

In Manner 1 and Manner 2, the first transmission scheme may be indicated by using the first indication information, and a correspondence between the first transmission scheme and the first resource (including the first port group) is flexible and variable.

It should be understood that the foregoing listed higher layer parameters are merely examples, and should not constitute any limitation on this application. Specific signaling that carries the first indication information is not limited in this application, and for example, may be other higher layer signaling (for example, a MAC CE) or physical layer signaling (for example, DCI).

Manner 3

The first network device may indicate the first resource, that is, the CSI-RS resource for interference measurement, to the terminal device by using the first indication information.

Specifically, the first network device and the terminal device may pre-negotiate a correspondence between at least one group of resources and at least one type of transmission scheme, and the terminal device may determine a corresponding transmission scheme based on the first resource indicated by using the first indication information. The first indication information may be newly added signaling, or may be existing signaling. For example, the first indication information may be the higher layer signaling listed above.

As described above, the first network device may indicate the first resource by using higher layer signaling (for example, an RRC message). The first resource may be a CSI resource setting, and the CSI resource setting may correspond to a type of transmission scheme. Alternatively, the first resource may be an NZP CSI-RS resource set, and the NZP CSI-RS resource set may correspond to a type of transmission scheme. Alternatively, the first resource may be an NZP CSI-RS resource, and the NZP CSI-RS resource may correspond to a type of transmission scheme. Alternatively, the first resource may be a port included in an NZP CSI-RS resource, namely, a first port group, and the first port group may correspond to one or more types of transmission schemes.

The correspondence between at least one group of resources and at least one type of transmission scheme may be, for example, a correspondence between at least one CSI resource setting and at least one type of transmission scheme, a correspondence between at least one NZP CSI-RS resource set and at least one type of transmission scheme, a correspondence between at least one NZP CSI-RS resource and at least one type of transmission scheme, or a correspondence between at least one port and at least one type of transmission scheme.

In an implementation, the correspondence between at least one group of resources and at least one type of transmission scheme may be defined in a protocol. In other words, the correspondence between at least one group of resources and at least one type of transmission scheme is fixed, and the first network device and the terminal device may pre-store the mapping relationship in respective memories. When receiving the first indication information, the terminal device may determine the first transmission scheme based on a resource indicated by using the first indication information.

In another implementation, the mapping relationship between at least one group of resources and at least one type of transmission scheme may be semi-statically configured by using higher layer signaling. For example, the first network device may indicate the mapping relationship to the terminal device by using an RRC message, and the mapping relationship may remain unchanged in a relatively long period of time until the first network device reconfigures the mapping relationship next time by using an RRC message.

In addition, when the first indication information is used to indicate the first port group, a port number of the first port group may be directly or indirectly indicated.

Specifically, the first indication information may include an indication field used to indicate a port number; or the first indication information may include an indication field used to indicate a quantity of ports, and the terminal device may determine a corresponding port number based on the quantity of ports.

When the first indication information includes the indication field used to indicate the quantity of ports, the first network device and the terminal device may pre-agree upon a correspondence between a quantity of ports and a port number. When the first indication information is used to indicate a quantity of currently available ports, the terminal device may determine a number of a currently available port based on the correspondence between a quantity of ports and a port number.

In a possible manner, the correspondence between a quantity of ports and a port number may be predefined, for example, defined in a protocol, or may be indicated to the terminal device in advance by using signaling. For example, the correspondence may be defined as follows: When a quantity of ports is 2, port numbers are #0 and #1; when a quantity of ports is 4, port numbers are #0 to #3; when a quantity of ports is 8, port numbers are #7 to #14. In this case, the terminal device may determine a number of an available port based on the quantity of ports that is indicated in the first indication information.

In another possible manner, the correspondence between a quantity of ports and a port number may be determined according to a pre-agreed rule. Specifically, the first network device and the terminal device may pre-agree upon a rule for using a port number, and then a number of an available port is determined based on the indicated quantity of ports. For example, the rule is: sequentially using port numbers in ascending order starting from a port #0 based on the quantity of ports; or sequentially using port numbers in descending order starting from a port #31 based on the quantity of ports. This is not limited in this application.

It should be understood that the foregoing listed correspondences between a resource and a transmission scheme are merely examples for ease of understanding, and should not constitute any limitation on this application. Specific content of the correspondence between a resource and a transmission scheme is not limited in this application.

In Manner 3, the first transmission scheme may be determined by using the first resource indicated by using the first indication information and the pre-obtained mapping relationship between a resource and a transmission scheme. The correspondence between the first transmission scheme and the first resource is semi-static or static.

By way of example rather than limitation, the first transmission scheme may be any one of the following: the SFTD, the STTD, closed loop spatial multiplexing, or RE-level precoder cycling.

Optionally, the method 200 further includes: Step 220. The terminal device receives second indication information, where the second indication information is used to determine the second transmission scheme assumed for the terminal device to perform channel measurement.

Correspondingly, in step 220, the first network device sends the second indication information, where the second indication information is used to determine the second transmission scheme assumed for the terminal device to perform channel measurement.

As described above, the second transmission scheme is a transmission scheme assumed for channel measurement. Usually, for a time point, in other words, for each CSI measurement, the second transmission scheme is one type of transmission scheme. However, specific content of the second transmission scheme is not limited in this application.

By way of example rather than limitation, the second transmission scheme may be any one of the following: the SFTD, the STTD, the closed loop spatial multiplexing, or the RE-level precoder cycling.

In this embodiment of this application, a specific method for sending, by the first network device, the second indication information to the terminal device, so that the terminal device determines the second transmission scheme may be the same as the foregoing specific method for sending, by the first network device, the first indication information to the terminal device, so that the terminal device determines the first transmission scheme; or the second transmission scheme may be indicated by using other signaling. For example, a method in LTE may still be used. The first network device indicates a transmission mode in higher layer signaling (for example, an RRC message), and further indicates a type of transmission scheme in the transmission mode by using a DCI format. A correspondence between a transmission scheme and a DCI format may be predefined, and each type of transmission scheme may correspond to one DCI format. A correspondence between a transmission mode and a transmission scheme may also be predefined, and each transmission mode may include two or more types of transmission schemes.

In addition, the first network device may further indicate, to the terminal device by using existing signaling, for example, the CSI resource setting described above, the CSI-RS resource for channel measurement.

The foregoing has described in detail differences between equivalent channel matrices and between interference covariance matrices when the first transmission scheme is separately the SFTD, the STTD, the RE-level precoder cycling, and the closed loop spatial multiplexing. When the second transmission scheme is the foregoing listed several types of transmission schemes, the first transmission scheme has relatively great impact on the CSI measurement. Table 1 shows specific examples of whether an MMSE-IRC receiver needs to perform special CSI measurement when the first transmission scheme and the second transmission scheme are separately the SFTD, the STTD, the RE-level precoder cycling, and the closed loop spatial multiplexing.

TABLE 1

| | Second transmission scheme | | |
|---|---|---|---|
| First transmission scheme | SFTD or STTD | RE-level precoder cycling | Closed loop spatial multiplexing |
| SFTD or STTD | Yes | Yes | No |
| RE-level precoder cycling | Yes | Yes | Yes |
| Closed loop spatial multiplexing | No | No | No |

In Table 1, when the first transmission scheme is the SFTD, the STTD, or the RE-level precoder cycling, and the second transmission scheme is the SFTD, the STTD, or the RE-level precoder cycling, special CSI measurement needs to be performed. When the first transmission scheme is the RE-level precoder cycling, and the second transmission scheme is the closed loop spatial multiplexing, special CSI measurement also needs to be performed. When the first transmission scheme is the closed loop spatial multiplexing, and the second transmission scheme is the SFTD, the STTD, the RE-level precoder cycling, or the closed loop spatial multiplexing, conventional CSI measurement may be performed. When the first transmission scheme is the SFTD or the STTD, and the second transmission scheme is the closed loop spatial multiplexing, conventional CSI measurement may also be performed. That is, different transmission schemes assumed for interference measurement or different transmission schemes assumed for channel measurement may cause different impact on CSI measurement.

Optionally, the method 200 further includes: Step 230. The terminal device receives the CSI-RS for interference measurement.

Correspondingly, in step 230, the second network device sends the CSI-RS.

Optionally, the method 200 further includes: Step 240. The terminal device receives the CSI-RS for channel measurement.

Correspondingly, in step 240, the first network device sends the CSI-RS.

Specifically, the first network device may indicate a CSI-RS resource to the terminal device. The CSI-RS resource may include the CSI-RS resource (that is, the first resource) for interference measurement and the CSI-RS resource (that is, the second resource) for channel measurement. The terminal device may receive the first CSI-RS based on the first resource indicated by the first network device, and may receive the second CSI-RS based on the second resource indicated by the first network device.

In an implementation, the first network device may indicate one or more CSI resource settings in CSI-ReportConfig of a reporting setting. When one CSI-ReportConfig indicates a plurality of CSI resource settings, the plurality of CSI resource settings may include configuration information of the first resource and configuration information of the second resource. For example, a resource configured by using the first CSI resource setting in the plurality of CSI resource settings may be determined as the second resource, and a resource configured by using the second CSI resource setting in the plurality of CSI resource settings may be determined as the first resource. Therefore, the terminal device may receive, on the second resource configured by using the first CSI resource setting, the CSI-RS for channel measurement, and receive, on the first resource configured by using the second CSI resource setting, the CSI-RS for interference measurement.

It should be noted that the first resource may be used to send a plurality of first CSI-RSs, and the first resource may be multiplexed for the plurality of first CSI-RSs in a manner such as code division multiplexing (CDM), frequency division multiplexing (FDM), or time division multiplexing (TDM).

In another implementation, the terminal device may receive, based on the first port group indicated by using the second indication information (or other newly added indication information) sent by the first network device and on a time-frequency resource corresponding to the first port group, the CSI-RS for interference measurement. Alternatively, the terminal device may receive, based on the second port group indicated by using another piece of indication information sent by the first network device and on a time-frequency resource corresponding to the second port group, the CSI-RS for channel measurement. Herein, the time-frequency resource corresponding to the first port group may be resources that are in different dimensions and that are configured in a same NZP CSI-RS resource, and the time-frequency resource corresponding to the second port group may be resources that are in different dimensions and that are configured in a same NZP CSI-RS resource.

It may be understood that the CSI-RS for interference measurement and the CSI-RS for channel measurement are relative to the terminal device. Actually, the CSI-RS transmitted on the first resource may be a CSI-RS for channel measurement that is sent by the second network device to another terminal device, or may be used only by the terminal device to perform interference measurement. For another terminal device, the CSI-RS transmitted on the second resource may be a CSI-RS for interference measurement. The CSI-RS for interference measurement or the CSI-RS for channel measurement is merely relative to the terminal device, and may not be distinguished for the network device.

It should be understood that the figure shows, merely for ease of understanding, an example in which the first network device and the second network device are different network devices, but this should not constitute any limitation on this application. As described above, the first network device and the second network device may alternatively be a same network device. In addition, a quantity of second network devices is not limited to one, and there may alternatively be a plurality of second network devices. When there are a plurality of second network devices, one of the plurality of second network devices may be exactly the first network device, or all the plurality of second network devices may be different from the first network device. This is not limited in this application.

Because a specific method for sending a CSI-RS by the network device and a specific method for receiving a CSI-RS by the terminal device may be the same as those in the prior art, for brevity, detailed descriptions of CSI-RS receiving and sending processes are omitted in step 230 and step 240 herein.

Optionally, the method 200 further includes: Step 250. The terminal device performs CSI measurement based on at least the first transmission scheme and the second transmission scheme.

The terminal device may determine the correspondence between the first transmission scheme and the first resource based on a plurality of possible implementations listed in step 210, and may determine a correspondence between the second transmission scheme and the second resource based on a plurality of possible implementations listed in step 220. Therefore, the terminal device may estimate an equivalent channel matrix and determine a covariance matrix based on the first transmission scheme and the first CSI-RS received on the first resource; and may further estimate an equivalent channel matrix based on the second transmission scheme and the second CSI-RS received on the second resource, to further determine CSI.

In other words, the terminal device may perform CSI measurement based on at least the first transmission scheme, the first CSI-RS, the second transmission scheme, and the second CSI-RS.

Specifically, the terminal device may determine an SINR or a signal-to-noise ratio (SNR) based on the equivalent channel matrix and the interference covariance matrix that are obtained by using the first CSI-RS, and then determine a CQI based on a predefined correspondence between an SINR (or an SNR) and a CQI.

A process of calculating an SINR by a terminal device is used as an example. It is assumed that a first transmission scheme is SFTD, and a second transmission scheme is also the SFTD. For example, the terminal device may receive second CSI-RSs on a port #2i and a port #2i+1, and receive first CSI-RSs on a port #2j (where j>0 and is an integer) and a port #2j+1. The terminal device may estimate, based on the received first CSI-RSs, equivalent channel vectors $\hat{h}_{2j}$ and $\hat{h}_{2j+1}$ corresponding to the port #2j and the port #2j+1, and construct an equivalent channel matrix $$H_j = \begin{bmatrix} \hat{h}_{2j} & \hat{h}_{2j+1} \\ \hat{h}^*_{2j+1} & -\hat{h}^*_{2j} \end{bmatrix}$$

by using the equivalent channel vectors $\hat{h}_{2j}$ and $\hat{h}_{2j+1}$. The terminal device may estimate, based on the received second CSI-RSs, equivalent channel vectors $\hat{h}_{2i}$ and $\hat{h}_{2i+1}$ corresponding to the port #2i and the port #2i+1, and construct an equivalent channel matrix $$H_i = \begin{bmatrix} \hat{h}_{2i} & \hat{h}_{2i+1} \\ \hat{h}^*_{2i+1} & -\hat{h}^*_{2i} \end{bmatrix}$$

by using the equivalent channel vectors $\hat{h}_{2i}$ and $\hat{h}_{2i+1}$. Let $$\begin{bmatrix} \hat{h}_{2j} & \hat{h}_{2j+1} \\ \hat{h}^*_{2j+1} & -\hat{h}^*_{2j} \end{bmatrix} = [a_{2j}\ a_{2j+1}], \text{ and } \begin{bmatrix} \hat{h}_{2i} & \hat{h}_{2i+1} \\ \hat{h}^*_{2i+1} & -\hat{h}^*_{2i} \end{bmatrix} = [a_{2i}\ a_{2i+1}].$$

In this case, the SINR obtained by the terminal device through measurement may be determined by using the following formula:

$$\text{SINR} = a_{2i}^H(N_0 I + a_{2i+1}a_{2i+1}^H + a_{2j}a_{2j}^H + a_{2j+1}a_{2j+1}^H)^{-1} a_{2i} \quad \text{formula (1); or}$$

$$\text{SINR} = a_{2i+1}^H(N_0 I + a_{2i}a_{2i}^H + a_{2j}a_{2j}^H + a_{2j+1}a_{2j+1}^H)^{-1} a_{2i+1} \quad \text{formula (2).}$$

Two calculation methods in the formula (1) and the formula (2) are equivalent. In the formulas, $N_0$ represents a power of white Gaussian noise, and I represents an identity matrix.

For another example, it is assumed that a first transmission scheme is a TS 1, and a second transmission scheme is SFTD. For example, the terminal device may receive second CSI-RSs on a port #2i and a port #2i+1, and receive first CSI-RSs on a port #2j. The terminal device may estimate, based on the received first CSI-RS, an equivalent channel vector $\hat{h}_{2j}$ corresponding to the port #2j; and may estimate, based on the received second CSI-RSs, equivalent channel vectors corresponding to the port #2i and the port #2i+1, construct an equivalent channel matrix $$H_i = \begin{bmatrix} \hat{h}_{2i} & \hat{h}_{2i+1} \\ \hat{h}^*_{2i+1} & -\hat{h}^*_{2i} \end{bmatrix}$$

by using the equivalent channel vectors corresponding to the port #2i and the port #2i+1. Let $$\begin{bmatrix} \hat{h}_{2i} & \hat{h}_{2i+1} \\ \hat{h}^*_{2i+1} & -\hat{h}^*_{2i} \end{bmatrix} = [a_{2i}\ a_{2i+1}], \text{ and } G_{2j} = \begin{bmatrix} \hat{h}_{2j}\hat{h}^H_{2j} & 0 \\ 0 & \hat{h}_{2j}\hat{h}^H_{2j} \end{bmatrix},$$

to obtain a matrix having a same dimension as that of $a_{2i}$. In this case, the SINR obtained by the terminal device through measurement may be determined by using the following formula:

$$\text{SINR} = a_{2i}^H(N_0 I + a_{2i+1}a_{2i+1}^H + G_{2j})^{-1} a_{2i} \quad \text{formula (3); or}$$

$$\text{SINR} = a_{2i+1}^H(N_0 I + a_{2i}a_{2i}^H + G_{2j})^{-1} a_{2i+1} \quad \text{formula (4).}$$

Two calculation methods in the formula (3) and the formula (4) are equivalent.

$a_{2i}$ or $a_{2i+1}$ above is different from $G_{2j}$. Therefore, CSI determined by using the formula (1) or the formula (2) above is different from CSI determined by using the formula (3) or the formula (4).

Optionally, the terminal device may alternatively perform CSI measurement with reference to the foregoing ZP CSI-RS for interference measurement (namely, a ZP CSI-RS transmitted on the CSI-IM resource).

The foregoing example is still used. It is assumed that a first transmission scheme is SFTD, and a second transmission scheme is also the SFTD. For example, the terminal device may receive second CSI-RSs on a port #2i and a port #2i+1, and receive first CSI-RSs on a port #2j and a port #2j+1. As described above, an equivalent channel matrix $H_j = [a_{2j}\ a_{2j+1}]$ may be obtained based on the first CSI-RSs, and an equivalent channel matrix $H_i = [a_{2i}\ a_{2i+1}]$ may be obtained based on the second CSI-RSs. If the ZP CSI-RS transmitted on the CSI-IM resource is further considered, the SINR obtained by the terminal device through measurement may be determined by using the following formula:

$$\text{SINR} = a_{2i}^H(N_0 I + PI + a_{2i+1}a_{2i+1}^H + a_{2j}a_{2j}^H + a_{2j+1}a_{2j+1}^H)^{-1} a_{2i} \quad \text{formula (5); or}$$

$$\text{SINR} = a_{2i+1}^H(N_0 I + PI + a_{2i}a_{2i}^H + a_{2j}a_{2j}^H + a_{2j+1}a_{2j+1}^H)^{-1} a_{2i+1} \quad \text{formula (6).}$$

Two calculation methods in the formula (5) and the formula (6) are equivalent. P represents a power of an interference signal received on CSI-IM resource.

It should be understood that the foregoing describes in detail, merely for ease of understanding, an SINR calculation process separately by using an example in which the first transmission scheme is the SFTD or the STTD that corresponds to two ports and an example in which the first transmission scheme is the TS 1 corresponding to one port. However, this should not constitute any limitation on this application. A quantity of types of first transmission schemes is not limited to one, and a quantity of first port groups is not limited to one or two above. The terminal device may receive first CSI-RSs on more ports on a same time-frequency resource, and the first CSI-RSs correspond to more types of transmission schemes.

For example, if the terminal device receives first CSI-RSs on a port #2j, a port #2j+1, a port #2k, and a port #2k+1, and first transmission schemes are all SFTD or STTD, the foregoing formula (1) may be further transformed into:

$$\text{SINR} = a_{2i}^H(N_0 I + a_{2i+1}a_{2i+1}^H + a_{2j}a_{2j}^H + a_{2j+1}a_{2j+1}^H + a_{2k}a_{2k}^H + a_{2k+1}a_{2k+1}^H)^{-1} a_{2i}.$$

As described above, $a_{2j}$ and $a_{2j+1}$ are respectively two column vectors of an equivalent channel matrix constructed by using equivalent channel vectors obtained through measurement based on the first CSI-RSs received on the port #2j and the port #2j+1. Similarly, $a_{2k}$ and $a_{2k+1}$ are respectively two column vectors of an equivalent channel matrix constructed by using equivalent channel vectors obtained through measurement based on the first CSI-RSs received on the port #2k and the port #2k+1.

It should be understood that the foregoing lists, with reference to different transmission schemes, a possible implementation of determining an SINR. However, this should not constitute any limitation on this application. The terminal device may alternatively determine an SINR based on another receiver algorithm.

After determining the SINR, the terminal device may determine the CQI based on the correspondence between an SINR and a CQI.

It should be further understood that determining the CQI by the terminal device based on the SINR is merely a possible implementation of determining the CQI, and should not constitute any limitation on this application. For a specific process of determining the CQI by the terminal device, refer to the prior art. For brevity, detailed descriptions of the specific process are omitted herein.

In addition, the foregoing only uses the CQI as an example to describe in detail impact of different first transmission schemes and different second transmission schemes on the CQI. However, this should not constitute any limitation on this application, and the first transmission scheme or the second transmission scheme may also have different impact on a PMI. For a specific process of performing CSI measurement by the terminal device, refer to the prior art. For brevity, details are not described herein.

Step 260. The terminal device sends the CSI, where the CSI is obtained through CSI measurement based on at least the first transmission scheme and the second transmission scheme.

The terminal device may send, to a first network device, the CSI obtained through CSI measurement in step 250. Herein, the first network device to which the terminal device sends the CSI may be the first network device that sends the first indication information to the terminal device in step 210 or the first network device that sends the second indication information to the terminal device in step 220, or may be another first network device. This is not limited in this application. If the terminal device sends the CSI to the first network device in step 260, the first network device receives the CSI in step 260.

After receiving the CSI, the first network device may determine an MCS based on the CQI in the CSI, and determine a precoding matrix based on an RI and a PMI in the CSI, to process and send to-be-sent data.

It should be understood that for a specific method for and a specific process of determining, by the first network device, the MCS or the precoding matrix based on the CSI, and processing and sending the to-be-sent data, refer to the prior art. For brevity, detailed descriptions of the specific method and process are omitted herein.

Based on the foregoing technical solution, the terminal device may determine, according to the first indication information sent by the first network device, the first transmission scheme assumed for the interference measurement, and perform CSI measurement with reference to the first transmission scheme and the second transmission scheme assumed for the channel measurement. CSI measurement is performed based on different assumed transmission schemes, so that impact of the first transmission scheme or the second transmission scheme on the CSI measurement can be considered. This helps improve accuracy of the CSI measurement, thereby helping improve data transmission quality.

It should be understood that sequence numbers of the foregoing processes do not mean execution sequences in the embodiments of this application. The execution sequences of the processes should be determined based on functions and internal logic of the processes, and should not constitute any limitation on the implementation process of the embodiments of this application.

The foregoing describes in detail, with reference to FIG. 2, the communication method provided in the embodiments of this application. The following describes in detail, with reference to FIG. 3 to FIG. 6, an apparatus provided in the embodiments of this application.

Figure 3:
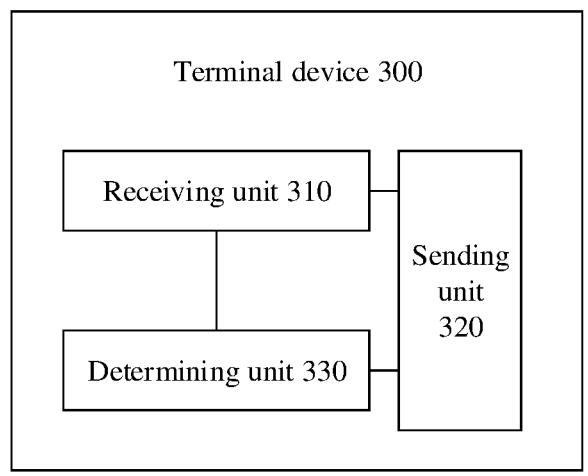
FIG. 3 is a schematic block diagram of a terminal device according to an embodiment of this application.

FIG. 3 is a schematic block diagram of a terminal device 300 according to an embodiment of this application. As shown in the figure, the terminal device 300 may include a receiving unit 310 and a sending unit 320.

The receiving unit 310 is configured to receive first indication information from a network device, where the first indication information is used to determine a first transmission scheme assumed for the terminal device 300 to perform interference measurement.

The sending unit 320 is configured to send channel state information CSI, where the CSI is obtained by performing CSI measurement based on at least the first transmission scheme and a second transmission scheme, and the second transmission scheme is a transmission scheme assumed for the terminal device 300 to perform channel measurement.

Optionally, the first indication information is used to indicate the first transmission scheme, the first transmission scheme corresponds to a first resource, and the first resource is a CSI-RS resource for interference measurement.

Optionally, the first indication information is used to indicate a mapping relationship between a first port group and the first transmission scheme, and the mapping relationship between the first port group and the first transmission scheme includes a correspondence between at least one port included in the first port group and at least one type of transmission scheme.

The at least one port is a port for sending a first CSI-RS, and the first CSI-RS is a CSI-RS for interference measurement. Optionally, the first indication information is used to indicate a first resource, and the first resource is a CSI-RS resource for interference measurement.

Optionally, the first indication information is used to indicate a first resource, and the first resource is a CSI-RS resource for interference measurement.

The terminal device 300 further includes:
a determining unit 330, configured to determine, based on a pre-obtained mapping relationship, the first transmission scheme corresponding to the first resource, where the mapping relationship is used to indicate a correspondence between at least one group of resources and at least one type of transmission scheme.

Optionally, the first resource includes a first port, the first port is a port for sending a first CSI-RS, and the first CSI-RS is for interference measurement.

The mapping relationship is used to indicate a correspondence between at least one port and at least one type of transmission scheme.

Optionally, the receiving unit 310 is further configured to receive indication information of the mapping relationship from the network device.

Optionally, the mapping relationship is defined in a protocol.

Optionally, the receiving unit 310 is further configured to receive second indication information from the network device, where the second indication information is used to determine the second transmission scheme assumed for the terminal device 300 to perform channel measurement.

Optionally, the first transmission scheme is any one of the following: space time diversity, space frequency diversity, RE-level precoder cycling, or closed loop spatial multiplexing.

Optionally, the second transmission scheme is any one of the following: the space time diversity, the space frequency diversity, the RE-level precoder cycling, or the closed loop spatial multiplexing.

It should be understood that the terminal device 300 may correspond to the terminal device in the communication method 200 according to the embodiments of this application, and the terminal device 300 may include units configured to perform the method performed by the terminal device in the communication method 200 in FIG. 2. In addition, the units in the terminal device 300 and the foregoing other operations and/or functions are respectively intended to implement corresponding procedures of the communication method 200 in FIG. 2. Specific processes of performing the foregoing corresponding steps by the units have been described in detail in the method 200. For brevity, details are not described herein again.

Figure 4:
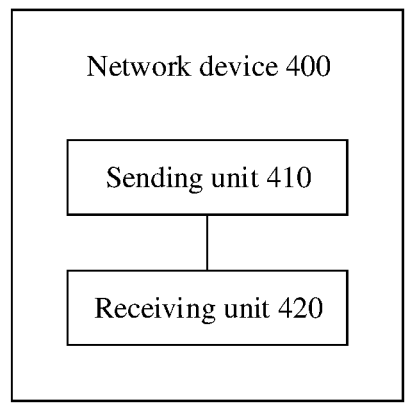
FIG. 4 is a schematic block diagram of a network device according to an embodiment of this application.

FIG. 4 is a schematic block diagram of a network device 400 according to another embodiment of this application. In a possible design, the network device 400 may be a network device or a chip disposed in a network device. This is not limited in this application.

As shown in the figure, the network device 400 includes a sending unit 410 and a receiving unit 420.

The sending unit 410 is configured to send first indication information to a terminal device, where the first indication information is used to determine a first transmission scheme assumed for the terminal device to perform interference measurement.

The receiving unit 420 is configured to receive channel state information CSI from the terminal device, where the CSI is obtained by performing CSI measurement based on at least the first transmission scheme and a second transmission scheme, and the second transmission scheme is a transmission scheme assumed for the terminal device to perform channel measurement.

Optionally, the first indication information is used to indicate the first transmission scheme, the first transmission scheme corresponds to a first resource, and the first resource is a CSI-RS resource for interference measurement.

Optionally, the first indication information is used to indicate a mapping relationship between a first port group and the first transmission scheme, and the mapping relationship between the first port group and the first transmission scheme includes a correspondence between at least one port included in the first port group and at least one type of transmission scheme.

The at least one port is a port for sending a first CSI-RS, and the first CSI-RS is a CSI-RS for interference measurement.

Optionally, the first indication information is used to indicate a first resource, and the first resource is a CSI-RS resource for interference measurement.

The sending unit 410 is further configured to send indication information of a mapping relationship to the terminal device, where the mapping relationship is used to indicate a correspondence between at least one group of resources and at least one type of transmission scheme.

Optionally, the first resource includes a first port group, the first port group includes one or more ports for sending a first CSI-RS, and the first CSI-RS is a CSI-RS for interference measurement.

The mapping relationship is used to indicate a correspondence between at least one port and at least one type of transmission scheme.

Optionally, the first transmission scheme is any one of the following: space time diversity, space frequency diversity, RE-level precoder cycling, or closed loop spatial multiplexing.

Optionally, the second transmission scheme is any one of the following: the space time diversity, the space frequency diversity, the RE-level precoder cycling, or the closed loop spatial multiplexing.

It should be understood that the network device 400 may correspond to the network device in the communication method 200 according to the embodiments of this application, and the network device 400 may include units configured to perform the method performed by the network device in the communication method 200 in FIG. 2. In addition, the units in the network device 400 and the foregoing other operations and/or functions are respectively intended to implement corresponding procedures of the communication method 200 in FIG. 2. Specific processes of performing the foregoing corresponding steps by the units have been described in detail in the method 200. For brevity, details are not described herein again.

Figure 5:
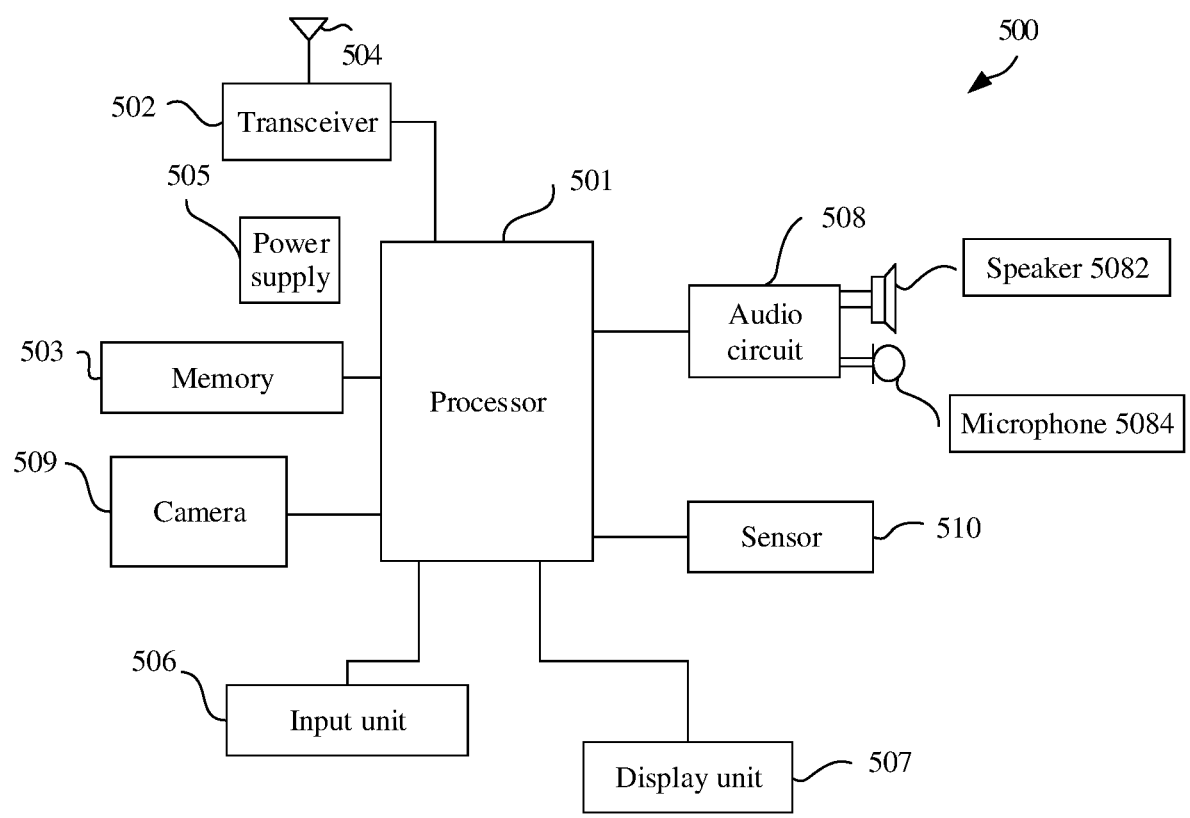
FIG. 5 is a schematic structural diagram of a terminal device according to an embodiment of this application.

FIG. 5 is a schematic structural diagram of a terminal device 500 according to an embodiment of this application. As shown in the figure, the terminal device 500 includes a processor 501 and a transceiver 502. Optionally, the terminal device 500 further includes a memory 503. The processor 501, the transceiver 502, and the memory 503 may communicate with each other through an internal connection path, to transfer a control signal and/or a data signal. The memory 503 is configured to store a computer program. The processor 501 is configured to invoke the computer program from the memory 503 and run the computer program, to control the transceiver 502 to send and receive a signal. Optionally, the terminal device 500 may further include an antenna 504, configured to send, by using a radio signal, uplink data or uplink control signaling that is output by the transceiver 502.

The processor 501 and the memory 503 may be integrated into one processing apparatus, and the processor 501 is configured to execute program code stored in the memory 503, to implement the foregoing functions. During specific implementation, the memory 503 may be integrated into the processor 501, or may be independent of the processor 501.

When a program instruction stored in the memory 503 is executed by the processor 501, the processor 501 is configured to control the transceiver 502 to receive first indication information and control the transceiver 502 to send CSI.

Specifically, the terminal device 500 may correspond to the terminal device in the communication method 200 according to the embodiments of this application, and the terminal device 500 may include units configured to perform the method performed by the terminal device in the communication method 200 in FIG. 2. In addition, the units in the terminal device 500 and the foregoing other operations and/or functions are respectively intended to implement corresponding procedures of the communication method 200 in FIG. 2. Specific processes of performing the foregoing corresponding steps by the units have been described in detail in the method 200. For brevity, details are not described herein again.

The processor 501 may be configured to perform actions described in the foregoing method embodiment that are implemented inside the terminal device, and the transceiver 502 may be configured to perform an action of sending to or receiving from a network device that is performed by the terminal device and that is described in the foregoing method embodiment. For details, refer to the descriptions in the foregoing method embodiment. Details are not described herein again.

Optionally, the terminal device 500 may further include a power supply 505, configured to supply power to various components or circuits in the terminal device.

In addition, the terminal device 500 may further include one or more of an input unit 506, a display unit 507, an audio circuit 508, a camera 509, a sensor 510, and the like, to better improve functions of the terminal device. The audio circuit may further include a speaker 5082, a microphone 5084, and the like.

In some possible implementations, the receiving unit 310 and the sending unit 320 in FIG. 3 may correspond to (for example, may be configured on or may be) the transceiver 502 in FIG. 5. The determining unit 330 in FIG. 3 may correspond to (for example, may be configured on or may be) the processor 501 in FIG. 5.

Figure 6:
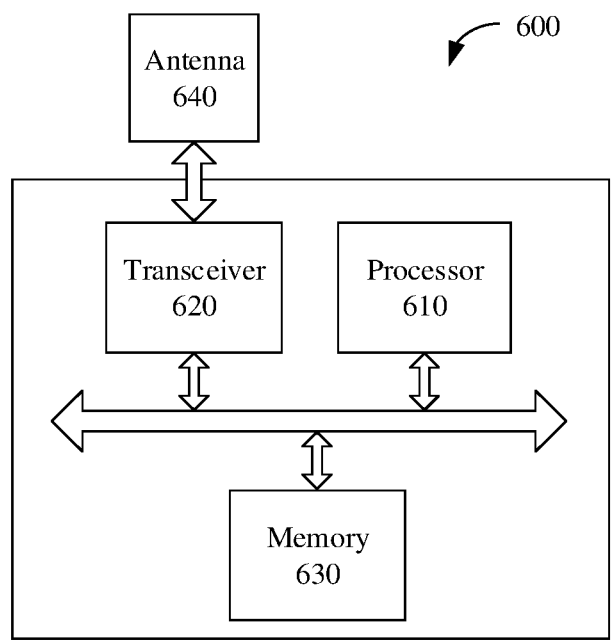
FIG. 6 is a schematic structural diagram of a network device according to an embodiment of this application.

FIG. 6 is a schematic structural diagram of a network device according to an embodiment of this application. As shown in the figure, the network device 600 includes a processor 610 and a transceiver 620. Optionally, the network device 600 further includes a memory 630. The processor 610, the transceiver 620, and the memory 630 communicate with each other through an internal connection path, to transfer a control signal and/or a data signal. The memory 630 is configured to store a computer program. The processor 610 is configured to invoke the computer program from the memory 630 and run the computer program, to control the transceiver 620 to send and receive a signal.

The processor 610 and the memory 630 may be integrated into one processing apparatus, and the processor 610 is configured to execute program code stored in the memory 630, to implement the foregoing functions. During specific implementation, the memory 630 may be integrated into the processor 610, or may be independent of the processor 610.

The network device 600 may further include an antenna 640, configured to send, by using a radio signal, downlink data or downlink control signaling that is output by the transceiver 620.

When a program instruction stored in the memory 430 is executed by the processor 410, the processor 410 is configured to: control the transceiver 420 to send first indication information, and control the transceiver 420 to receive CSI.

Specifically, the network device 600 may correspond to the network device in the communication method 200 according to the embodiments of this application, and the network device 600 may include units configured to perform the method performed by the network device in the communication method 200 in FIG. 2. In addition, the units in the network device 600 and the foregoing other operations and/or functions are respectively intended to implement corresponding procedures of the communication method 200 in FIG. 2. Specific processes of performing the foregoing corresponding steps by the units have been described in detail in the method 200. For brevity, details are not described herein again.

The processor 610 may be configured to perform actions described in the foregoing method embodiment that are implemented inside the network device, and the transceiver 620 may be configured to perform an action of sending to or receiving from a terminal device that is performed by the network device and that is described in the foregoing method embodiment. For details, refer to the descriptions in the foregoing method embodiment. Details are not described herein again.

In some possible implementations, the sending unit 410 and the receiving unit 420 in FIG. 4 may correspond to (for example, may be configured on or may be) the transceiver 620 in FIG. 6.

It should be understood that, the processor in the embodiments of this application may be a central processing unit (CPU), or may be another general purpose processor, a digital signal processor (DSP), an application-specific integrated circuit (application specific integrated circuit, ASIC), a field programmable gate array (FPGA) or another programmable logic device, a discrete gate or transistor logic device, a discrete hardware component, or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

This application further provides a communications apparatus. The communications apparatus may be the terminal device shown in FIG. 3 or FIG. 5, or may be a chip disposed in the terminal device shown in FIG. 3 or FIG. 5. This is not limited in this application.

This application further provides a communications apparatus. The communications apparatus may be the network device shown in FIG. 4 or FIG. 6, or may be a chip disposed in the network device shown in FIG. 4 or FIG. 6. This is not limited in this application.

According to the method provided in the embodiments of this application, this application further provides a computer program product. The computer program product includes computer program code. When the computer program code is run on a computer, the computer is enabled to perform the method in the embodiment shown in FIG. 2.

According to the method provided in the embodiments of this application, this application further provides a computer-readable medium. The computer-readable medium stores program code. When the program code is run on a computer, the computer is enabled to perform the method in the embodiment shown in FIG. 2.

According to the method provided in the embodiments of this application, this application further provides a system, including one or more terminal devices and one or more network devices above.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded or executed on a computer, the procedures or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, indication information of a mapping relationship from a network device;
   receiving, by the terminal device, first indication information from the network device, wherein the first indication information indicates a first resource for interference measurement, wherein the first indication information indicates a first transmission scheme for signal transmissions, and the first indication information indicates that the first transmission scheme is configured for the terminal device to perform interference measurement,
   wherein the first resource comprises a first port group comprising one or more ports for sending a first channel state information reference signal (CSI-RS), and the first CSI-RS is a CSI-RS for interference measurement, and
   wherein the mapping relationship indicates a correspondence between at least one port of the first port group and at least one transmission scheme;
   determining, by the terminal device based on the mapping relationship between the first resource and the first transmission scheme, the first transmission scheme corresponding to the first resource; and
   determining, by the terminal device, a signal processing manner of performing a channel state information (CSI) measurement at least based on both the first transmission scheme configured for interference measurement and a second transmission scheme configured for channel measurement, wherein the second transmission scheme is a scheme for signal transmissions, wherein the signal processing manner of performing the CSI measurement including resource granularity of a frequency band width or a number of resource elements (REs) for the CSI measurement, and wherein the first transmission scheme and the second transmission scheme are of a plurality of transmission schemes including a first set of multiplexing transmission schemes and a second set of transmit diversity transmission schemes;

performing, by the terminal device, the CSI measurement to obtain the CSI according to the signal processing manner; and sending, by the terminal device, the CSI.

2. The method according to claim 1, wherein the first resource is a CSI-RS resource for interference measurement.

3. The method according to claim 1, wherein the first indication information indicates a first mapping relationship between a first port and the first transmission scheme, and the first port is a port for sending a first CSI-RS for interference measurement.

4. The method according to claim 1, wherein the mapping relationship is defined in a protocol.

5. The method according to claim 1, further comprising:
receiving, by the terminal device, second indication information from the network device, wherein the second indication information indicates the second transmission scheme for channel measurement.

6. A method, comprising:
sending, by a network device, indication information of a mapping relationship to a terminal device;
sending, by the network device, first indication information to the terminal device, wherein the first indication information indicates a first resource for interference measurement, wherein the first indication information indicates a first transmission scheme for signal transmissions, and the first indication information indicates that the first transmission scheme is configured for the terminal device to perform interference measurement,
wherein the first resource comprises a first port group comprising one or more ports for sending a first channel state information reference signal (CSI-RS), and the first CSI-RS is a CSI-RS for interference measurement,
wherein the mapping relationship indicates a correspondence between at least one port of the first port group and at least one transmission scheme, and
wherein the first transmission scheme corresponding to the first resource is determined based on the mapping relationship between the first resource and the first transmission scheme; and
receiving, by the network device from the terminal device, the CSI, the CSI being obtained according to a signal processing manner that is determined by the terminal device at least based on both the first transmission scheme configured for interference measurement and a second transmission scheme configured for channel measurement, wherein the second transmission scheme is a scheme for signal transmissions, wherein the signal processing manner including resource granularity of a frequency band width or a number of resource elements (REs) for CSI measurement, and wherein the first transmission scheme and the second transmission scheme are of a plurality of transmission schemes including a first set of multiplexing transmission schemes and a second set of transmit diversity transmission schemes.

7. The method according to claim 6, wherein the first resource is a CSI-RS resource for interference measurement.

8. The method according to claim 6, wherein the first indication information indicates a first mapping relationship between a first port and the first transmission scheme, the first port is a port for sending a first CSI-RS, and the first CSI-RS is a CSI-RS for interference measurement.

9. The method according to claim 6, wherein the method further comprises:
sending, by the network device, second indication information to the terminal device, wherein the second indication information indicates the second transmission scheme used by the terminal device to perform channel measurement.

10. A apparatus, comprising:
a non-transitory memory storage comprising instructions; and
one or more processors in communication with the non-transitory memory storage, wherein the instructions, when executed by the one or more processors, cause the apparatus to:
receive indication information of a mapping relationship from a network device;
receive first indication information indicating a first transmission scheme for signal transmissions, the first indication information indicating a first resource for interference measurement, the first indication information indicating that the first transmission scheme is configured for the apparatus to perform interference measurement,
wherein the first resource comprises a first port group comprising one or more ports for sending a first channel state information reference signal (CSI-RS), and the first CSI-RS is a CSI-RS for interference measurement, and
wherein the mapping relationship indicates a correspondence between at least one port of the first port group and at least one transmission scheme;
determining, based on the mapping relationship between the first resource and the first transmission scheme, the first transmission scheme corresponding to the first resource;
determine the first transmission scheme according to the first indication information;
determining a signal processing manner of performing a channel state information (CSI) measurement at least based on both the first transmission scheme configured for interference measurement and a second transmission scheme configured for channel measurement, wherein the second transmission scheme is a scheme for signal transmissions, wherein the signal processing manner of performing the CSI measurement including resource granularity of a frequency band width or a number of resource elements (REs) for the CSI measurement, and wherein the first transmission scheme and the second transmission scheme are of a plurality of transmission schemes including a first set of multiplexing transmission schemes and a second set of transmit diversity transmission schemes;
perform the CSI measurement to obtain the CSI according to the signal processing manner; and
send the CSI.

11. The apparatus according to claim 10, wherein the first resource is a CSI-RS resource for interference measurement.

12. The apparatus according to claim 10, wherein the first indication information indicates a first mapping relationship between a first port and the first transmission scheme, and the first port is a port for sending a first CSI-RS, and the first CSI-RS is a CSI-RS for interference measurement.

13. The apparatus according to claim 10, wherein the mapping relationship is defined in a protocol.

14. The apparatus according to claim 10, wherein the instructions, when executed by the one or more processors, cause the apparatus further to receive second indication information indicating the second transmission scheme for channel measurement; and determine, according to the second indication information, the second transmission scheme for channel measurement.

15. A apparatus, comprising:
a non-transitory memory storage comprising instructions; and
one or more processors in communication with the non-transitory memory storage, wherein the instructions, when executed by the one or more processors, cause the apparatus to:
send indication information of a mapping relationship to a terminal device;
send first indication information to the terminal device, wherein the first indication information indicates a first resource for interference measurement, wherein the first indication information indicates a first transmission scheme for signal transmissions, and the first indication information indicates that the first transmission scheme is configured for the terminal device to perform interference measurement,
wherein the first resource comprises a first port group comprising one or more ports for sending a first channel state information reference signal (CSI-RS), and the first CSI-RS is a CSI-RS for interference measurement,
wherein the mapping relationship indicates a correspondence between at least one port of the first port group and at least one transmission scheme, and
wherein the first transmission scheme corresponding to the first resource is determined based on the mapping relationship between the first resource and the first transmission scheme; and
receive, from the terminal device, the CSI, the CSI being obtained according to a signal processing manner that is determined by the terminal device at least based on both the first transmission scheme configured for interference measurement and a second transmission scheme configured for channel measurement, wherein the second transmission scheme is a scheme for signal transmissions, wherein the signal processing manner including resource granularity of a frequency band width or a number of resource elements (REs) for CSI measurement, and wherein the first transmission scheme and the second transmission scheme are of a plurality of transmission schemes including a first set of multiplexing transmission schemes and a second set of transmit diversity transmission schemes.

16. The apparatus according to claim 15, wherein the first resource is a CSI-RS resource for interference measurement.

17. The apparatus according to claim 15, wherein the first indication information indicates a first mapping relationship between a first port and the first transmission scheme, the first port is a port for sending a first CSI-RS, and the first CSI-RS is a CSI-RS for interference measurement.

18. The apparatus according to claim 15, wherein the instructions, when executed by the one or more processors, cause the apparatus further to:
generate second indication information indicating the second transmission scheme; and
send the second indication information.

* * * * *

UNITED STATES PATENT AND TRADEMARK OFFICE
CERTIFICATE OF CORRECTION

PATENT NO. : 12,199,920 B2
APPLICATION NO. : 17/099219
DATED : January 14, 2025
INVENTOR(S) : Wu et al.

Page 1 of 1

It is certified that error appears in the above-identified patent and that said Letters Patent is hereby corrected as shown below:

In the Claims

In Column 40, in Claim 10, Line 4, delete "A" and insert -- An --.

In Column 41, in Claim 15, Line 4, delete "A" and insert -- An --.

Signed and Sealed this
Fourth Day of March, 2025

Coke Morgan Stewart
*Acting Director of the United States Patent and Trademark Office*